US010999791B2

(12) United States Patent
Nagamatsu

(10) Patent No.: US 10,999,791 B2
(45) Date of Patent: *May 4, 2021

(54) COMMUNICATION APPARATUS, COMMUNICATION METHOD, AND PROGRAM

(71) Applicant: Sony Corporation, Tokyo (JP)

(72) Inventor: Tatsuo Nagamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,786

(22) Filed: Nov. 22, 2018

(65) Prior Publication Data

US 2019/0090184 A1 Mar. 21, 2019

Related U.S. Application Data

(63) Continuation of application No. 15/303,353, filed as application No. PCT/JP2015/053878 on Feb. 12, 2015, now Pat. No. 10,182,394.

(30) Foreign Application Priority Data

May 8, 2014 (JP) .................................. 2014-096869

(51) Int. Cl.
*H04L 12/28* (2006.01)
*H04W 52/02* (2009.01)
(Continued)

(52) U.S. Cl.
CPC ............. *H04W 52/02* (2013.01); *H04W 4/80* (2018.02); *H04W 52/028* (2013.01);
(Continued)

(58) Field of Classification Search
CPC ...................................................... H04L 12/50
(Continued)

(56) References Cited

U.S. PATENT DOCUMENTS 10,182,384 B2 * 1/2019 Weber ............... H04W 36/0072
2006/0089168 A1 4/2006 Ueda
(Continued)

FOREIGN PATENT DOCUMENTS

CN 103313296 A 9/2013
JP H10-177525 A 6/1998
(Continued)

OTHER PUBLICATIONS

Chinese Office Action dated May 28, 2019 in Chinese Application No. 2015800215383.
(Continued)

*Primary Examiner* — Dang T Ton
(74) *Attorney, Agent, or Firm* — Xsensus LLP

(57) ABSTRACT

[Object] To provide a communication apparatus, a communication method, and a program, each of which is capable of flexibly controlling operation of the communication apparatus in accordance with a change in communication environment while reducing power consumption.
[Solution] A communication apparatus includes: a control module configured to control operation of the communication apparatus; and a communication module configured to determine whether or not information obtained by reception from another communication apparatus has been changed and control state transition of the control module in a case where it is determined that the information obtained by the reception has been changed.

16 Claims, 15 Drawing Sheets

(51) Int. Cl.
*H04W 4/80* (2018.01)
*H04W 88/08* (2009.01)

(52) U.S. Cl.
CPC ........ *H04W 52/0229* (2013.01); *H04W 88/08* (2013.01); *Y02D 30/70* (2020.08)

(58) Field of Classification Search
USPC ........................................................ 370/400
See application file for complete search history.

(56) References Cited

U.S. PATENT DOCUMENTS

| | | | |
|---|---|---|---|
| 2012/0185717 A1 | 7/2012 | Song et al. | |
| 2013/0007301 A1* | 1/2013 | Jung | G06F 1/1632 710/5 |
| 2013/0238915 A1 | 9/2013 | Kashikar | |
| 2013/0329615 A1 | 12/2013 | Vyas et al. | |
| 2017/0034777 A1 | 2/2017 | Nagamatsu | |
| 2019/0005297 A1* | 1/2019 | Ostberg | G06K 9/00013 |

FOREIGN PATENT DOCUMENTS

| | | |
|---|---|---|
| JP | 2005-304002 A | 10/2005 |
| JP | 2006-348504 A | 12/2006 |
| JP | 2008-113334 A | 5/2008 |
| JP | 2011-032782 A | 2/2011 |
| JP | 2011-124983 A | 6/2011 |
| WO | 2008/107984 A1 | 9/2008 |
| WO | 2010/119983 A1 | 10/2010 |
| WO | 2013/184748 A1 | 12/2013 |

OTHER PUBLICATIONS

International Search Report dated Apr. 21, 2015 in PCT/JP2015/053878.
Japanese Office Action dated Sep. 18, 2018, issued in Japanese Patent Application No. 2016-517821.
Extended European Search Report dated Mar. 21, 2019 in European Application No. 19159675.8-1219.
Decision of Refusal dated Feb. 26, 2019 in Japanese Application No. 2016-517821.
Notification of Reason(s) for Refusal issued in Japanese Application 2016-517821 dated Dec. 11, 2018.

* cited by examiner

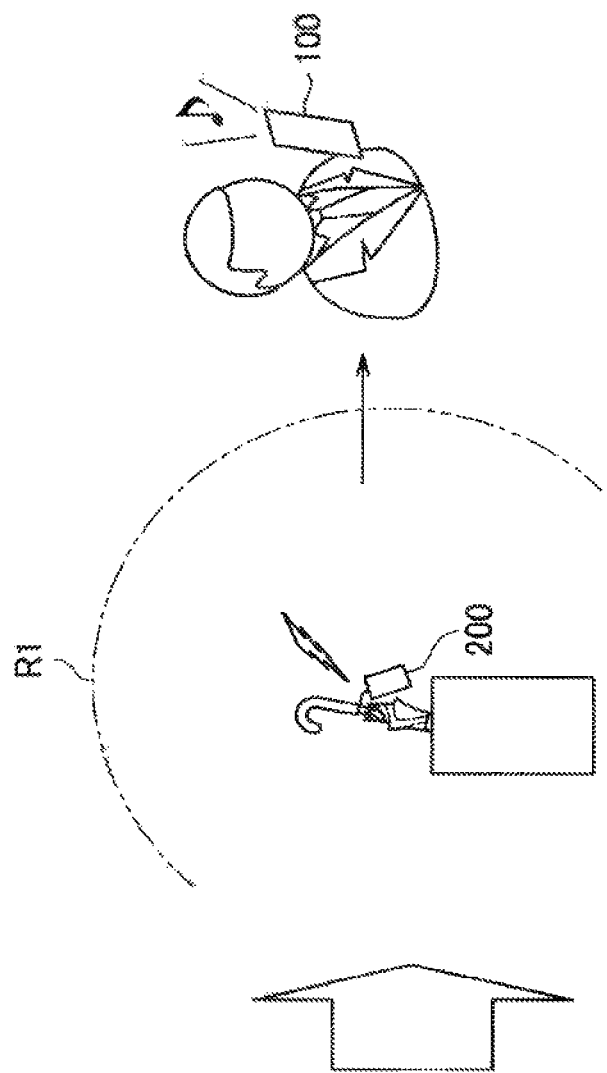
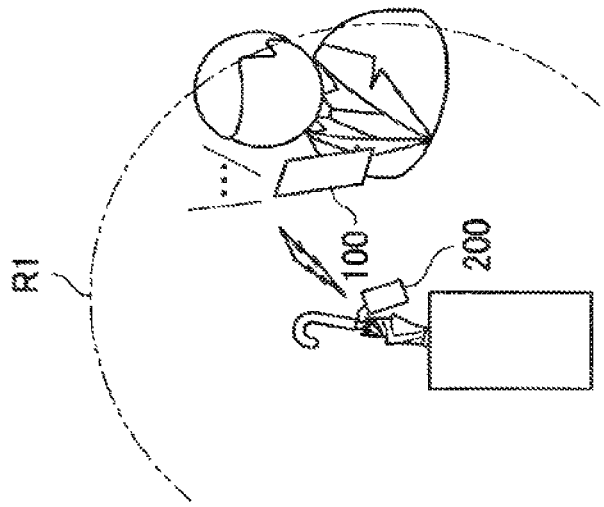
FIG. 1

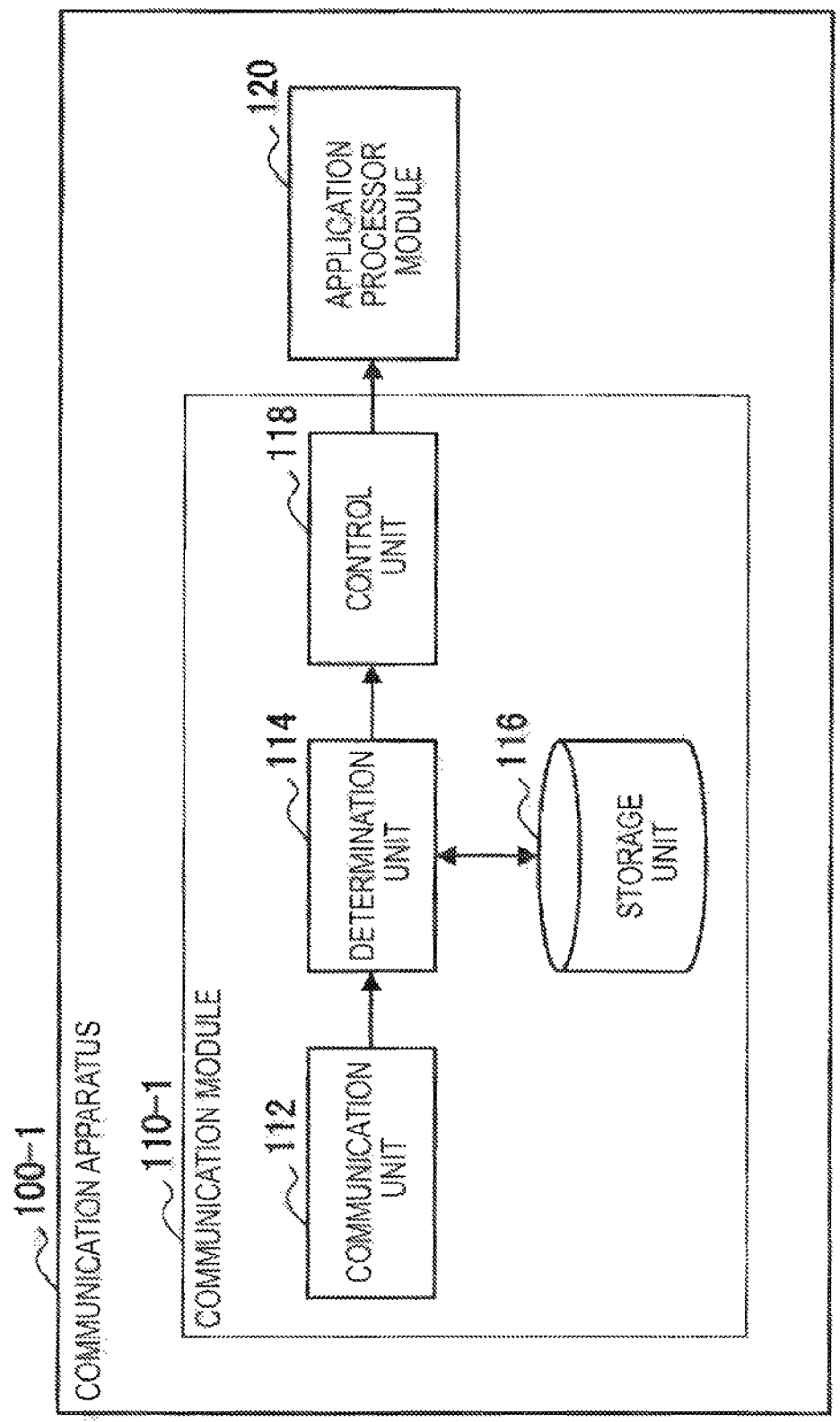

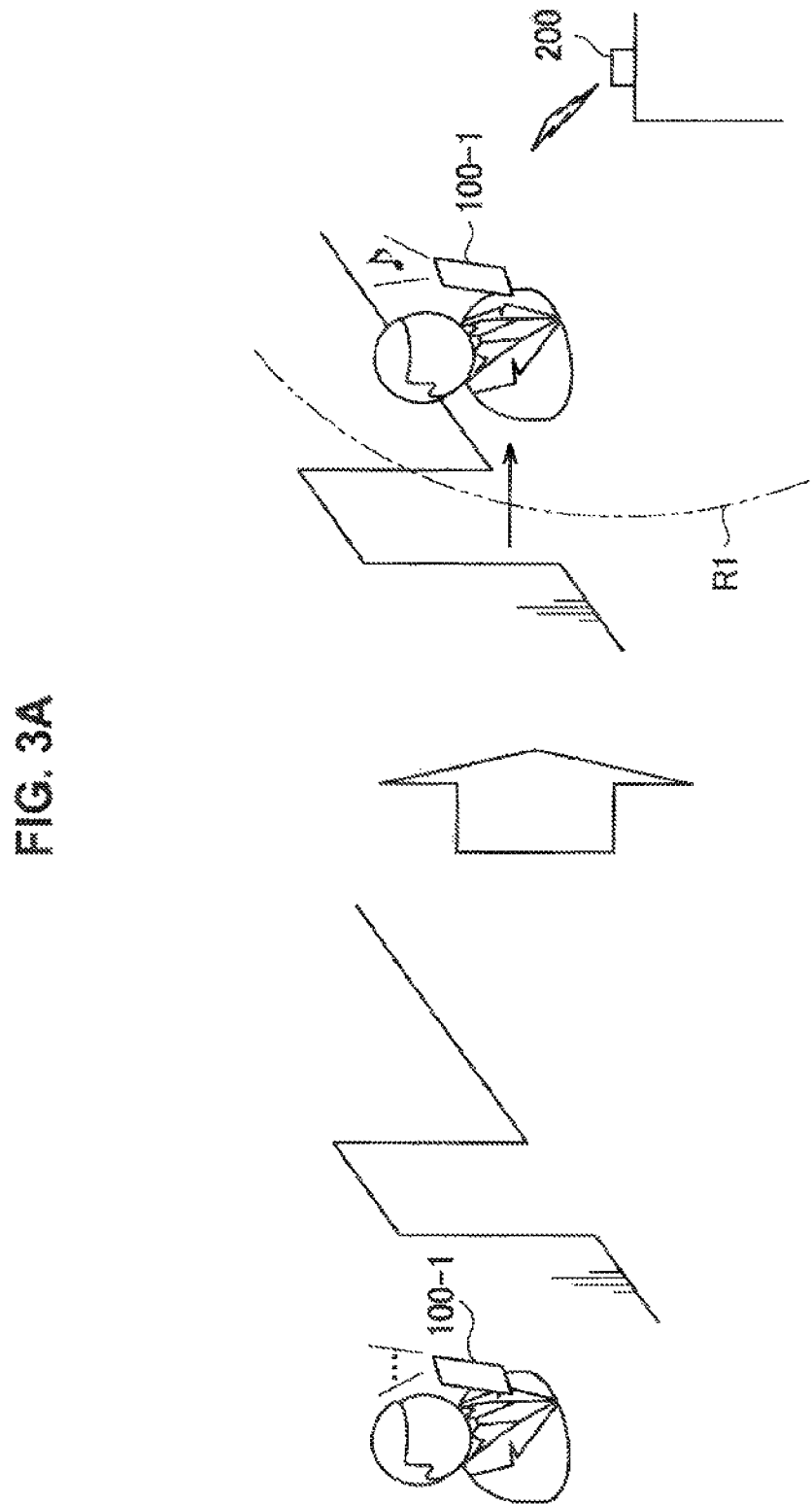

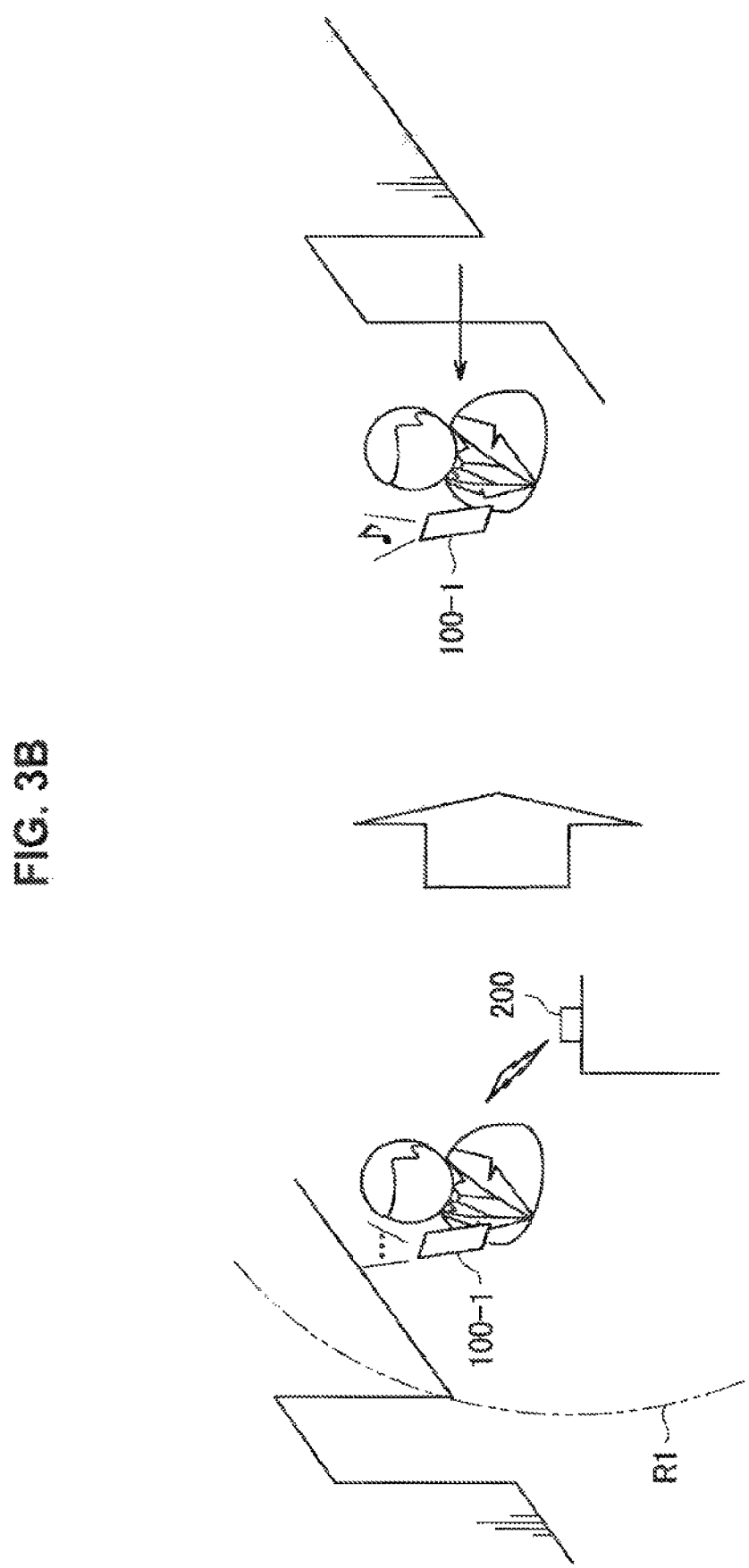

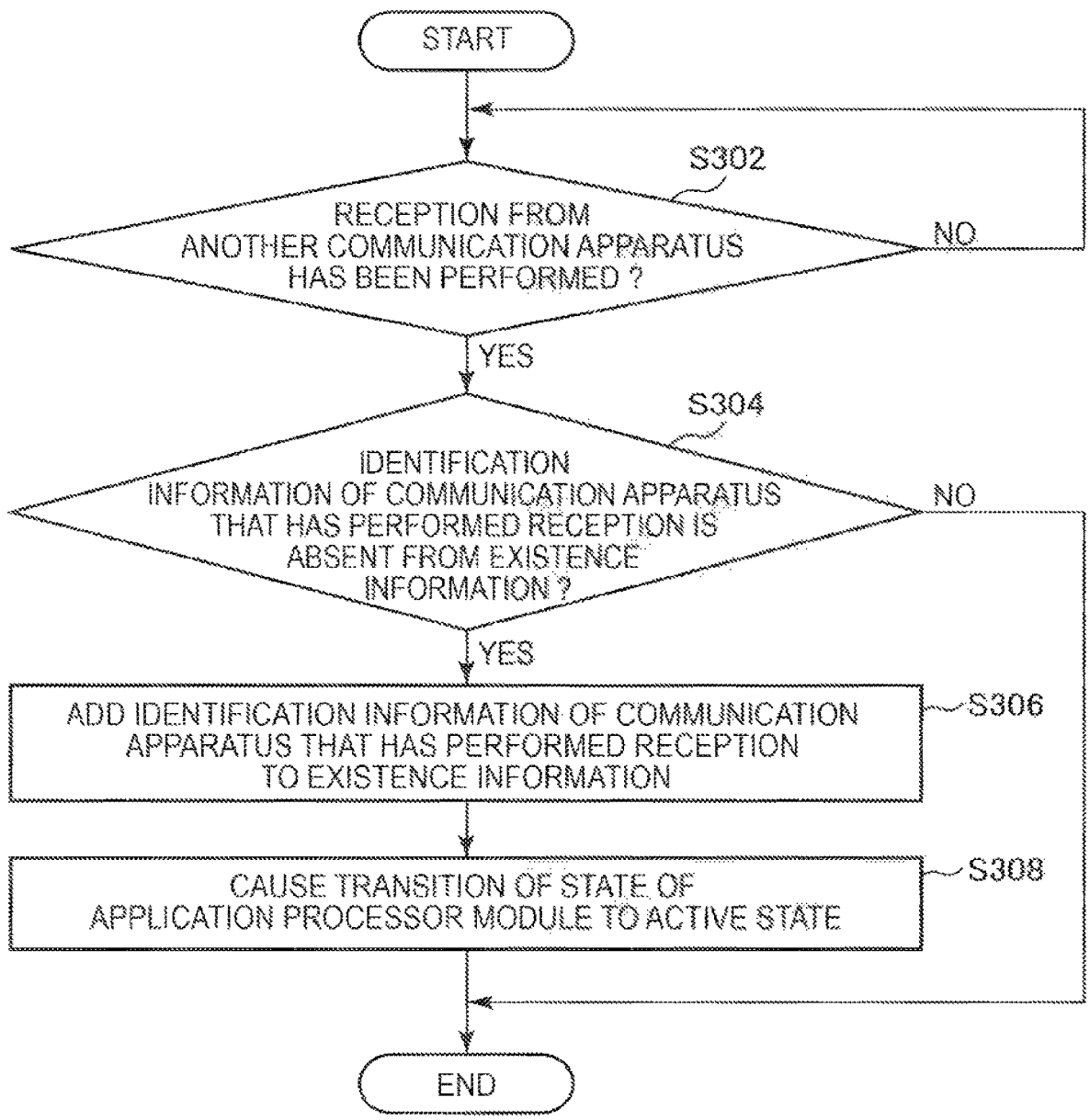

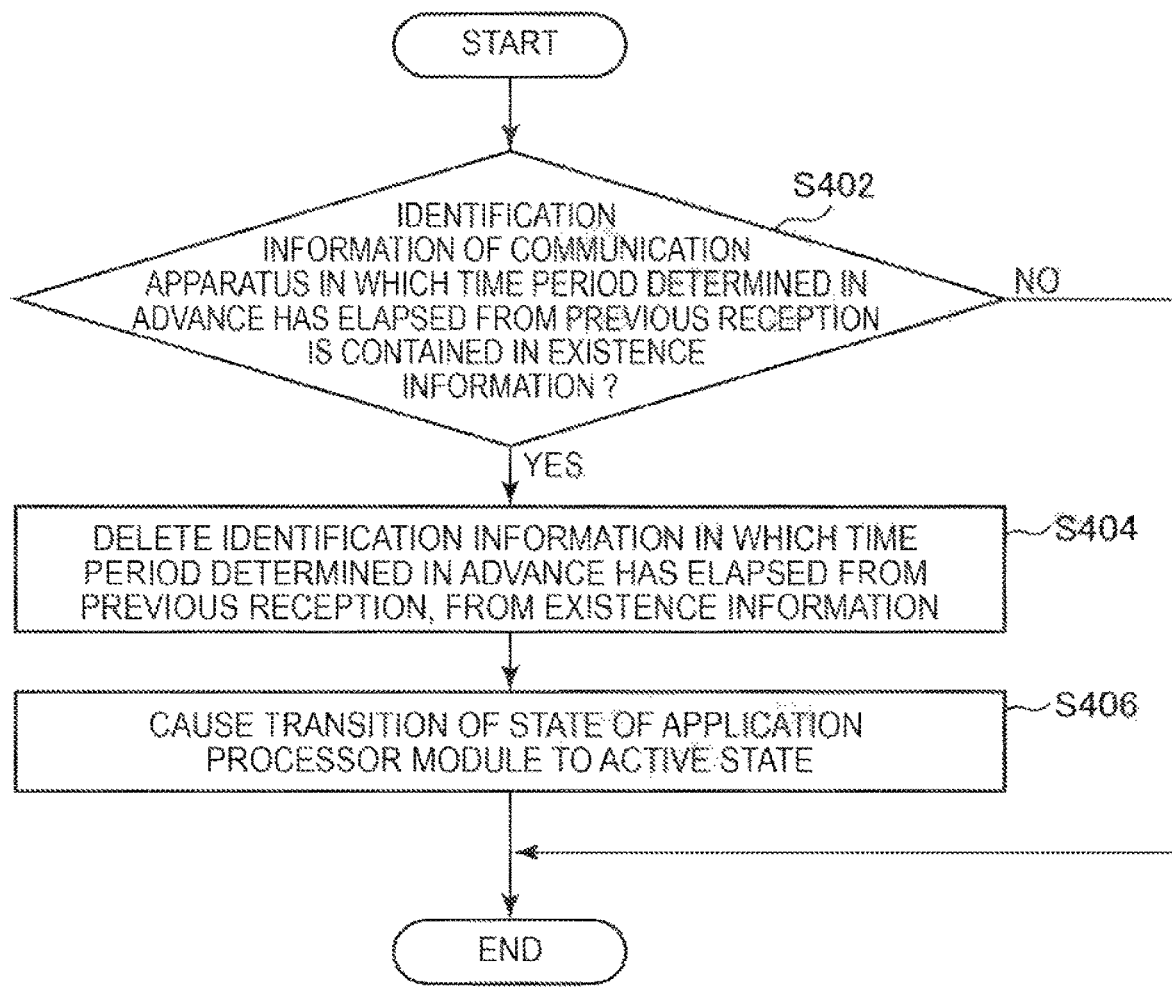

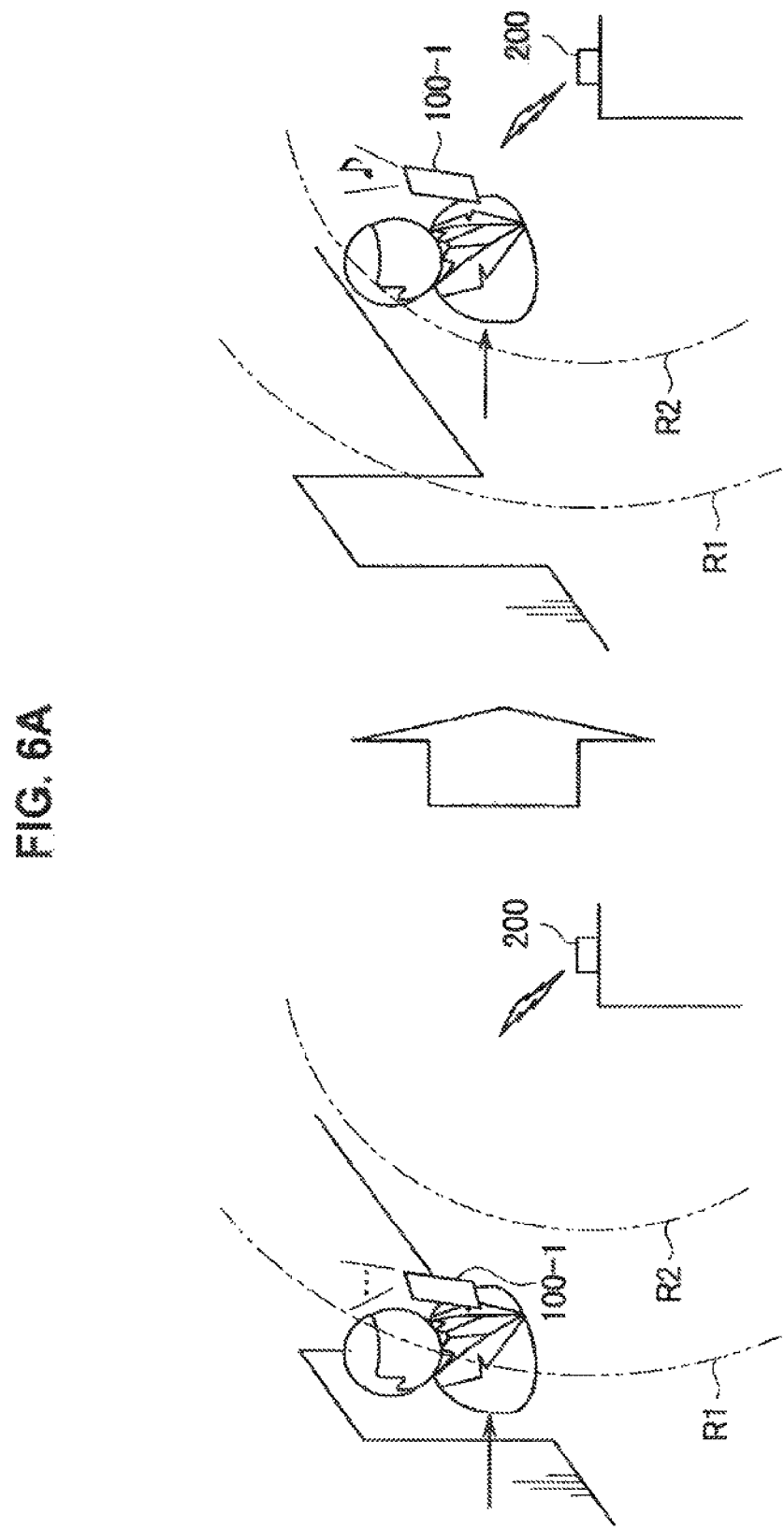

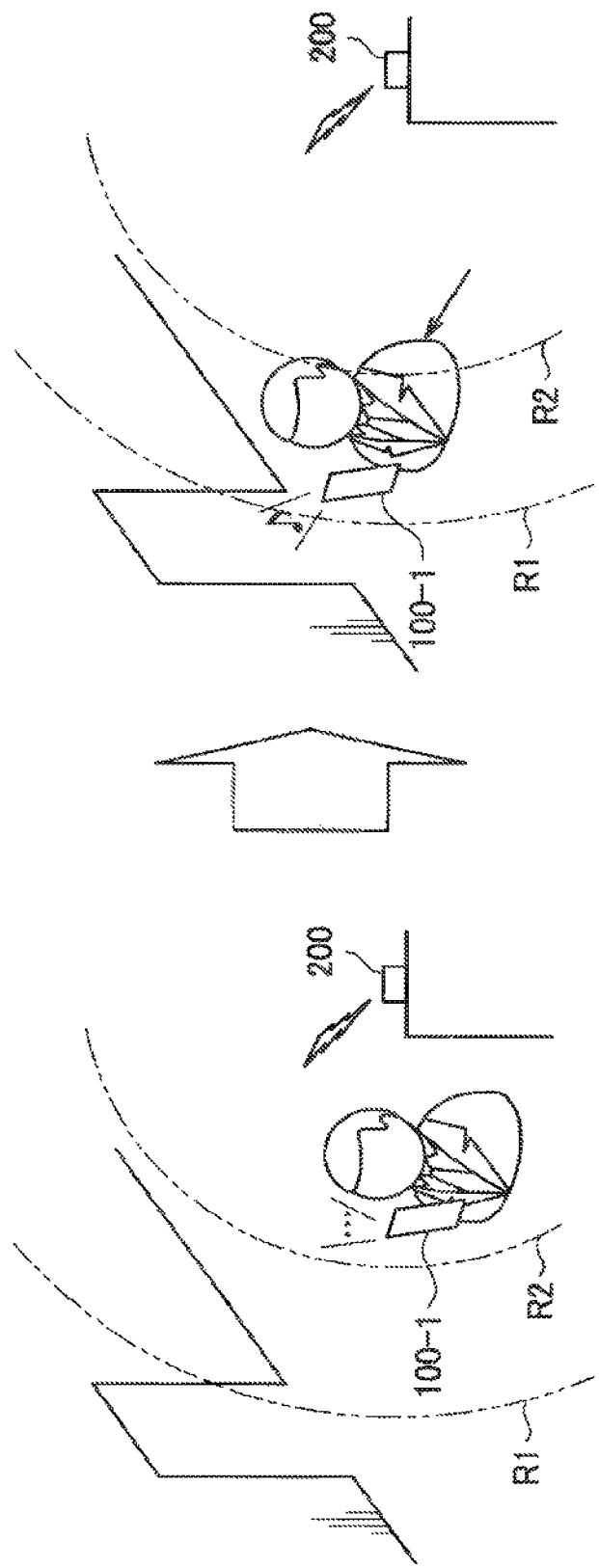

COMMUNICATION APPARATUS, COMMUNICATION METHOD, AND PROGRAM

CROSS-REFERENCE TO RELATED APPLICATION

This application is a continuation of U.S. patent application Ser. No. 15/303,353, filed on Oct. 11, 2016, which is a National Stage Entry of International Patent Application No. PCT/JP2015/053878, filed on Feb. 12, 2015, and claims priority to Japanese Patent Application 2014-096869, filed on May 8, 2014, the entire contents of which is hereby incorporated herein by reference in its entirety.

TECHNICAL FIELD

The present disclosure relates to a communication apparatus, a communication method, and a program.

BACKGROUND ART

In recent years, a portable communication apparatus having portability has been developed and productized in accordance with development of an information communication technology. However, such a portable communication apparatus generally tends to be reduced in size, and therefore it is difficult to increase the size of a battery to be mounted. In view of this, it is required to reduce power consumption in order to extend operating time.

For example, Patent Literature 1 discloses an invention in which, in the case where, in communication between devices in which a Bluetooth (registered trademark) system is mounted, a connection request is transmitted from another device, a host central processing unit (CPU) is started only when the Bluetooth system determines that the another device has been paired and connection with the another device is performed.

CITATION LIST

Patent Literature

Patent Literature 1: JP 2008-113334A

SUMMARY OF INVENTION

Technical Problem

However, in the invention disclosed in Patent Literature 1, the host CPU is not started unless a connection request is transmitted from a paired device, and therefore it is difficult to cause the host CPU to flexibly perform processing in accordance with a change in communication environment including an unspecified device.

In view of this, the present disclosure proposes a communication apparatus, a communication method, and a program, each of which is new, improved, and capable of flexibly controlling operation of the communication apparatus in accordance with a change in communication environment while reducing power consumption.

Solution to Problem

According to the present disclosure, there is provided a communication apparatus including: a control module configured to control operation of the communication apparatus; and a communication module configured to determine whether or not information obtained by reception from another communication apparatus has been changed and control state transition of the control module in a case where it is determined that the information obtained by the reception has been changed.

According to the present disclosure, there is provided a communication method including: controlling operation of a communication apparatus by using a control module; determining whether or not information obtained by reception from another communication apparatus has been changed; and controlling state transition of the control module in a case where it is determined that the information obtained by the reception has been changed.

According to the present disclosure, there is provided a program causing a computer to realize a function of controlling operation of a communication apparatus by using a control module, a function of determining whether or not information obtained by reception from another communication apparatus has been changed, and a function of controlling state transition of the control module in a case where it is determined that the information obtained by the reception has been changed.

Advantageous Effects of Invention

As described above, the present disclosure provides a communication apparatus, a communication method, and a program capable of flexibly controlling operation of the communication apparatus in accordance with a change in communication environment while reducing power consumption. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram for describing an overview of a communication apparatus according to an embodiment of the present disclosure.

FIG. 2 is a block diagram showing a schematic functional configuration of a communication apparatus according to a first embodiment of the present disclosure.

FIG. 3A shows an example of operation performed on the basis of existence information by the communication apparatus according to the present embodiment.

FIG. 3B shows another example of the operation performed on the basis of existence information by the communication apparatus according to the present embodiment.

FIG. 4 is a flowchart conceptually showing processing of the communication apparatus in the present embodiment regarding finding another communication apparatus.

FIG. 5 is a flowchart conceptually showing processing of the communication apparatus in the present embodiment regarding losing another communication apparatus.

FIG. 6A shows an example of operation performed on the basis of reception strength information by a communication apparatus according to a first modification example of the present embodiment.

FIG. 6B shows another example of the operation performed on the basis of reception strength information by the communication apparatus according to the first modification example of the present embodiment.

DESCRIPTION OF EMBODIMENT(S)

Figure 7:
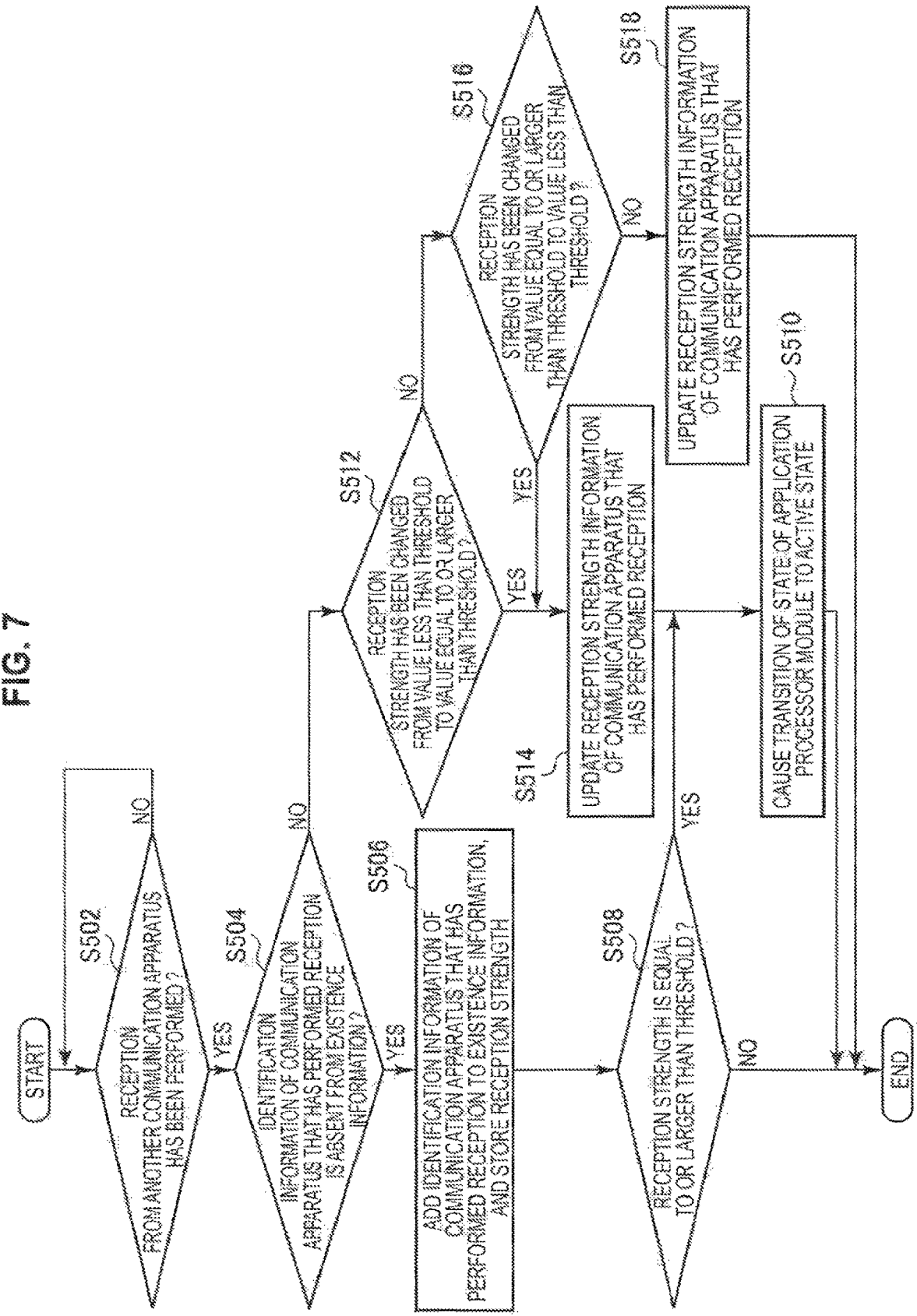
FIG. 7 is a flowchart conceptually showing processing performed by the communication apparatus in the first modification example of the present embodiment when reception strength information is changed.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Overview of communication apparatus according to embodiment of present disclosure
2. First embodiment of present disclosure (Example of processing based on existence information)
2-1. Configuration of communication apparatus
2-2. Processing of communication apparatus
2-3. Modification examples
3. Second embodiment of present disclosure (Example of processing using sensor module)
3-1. Configuration of communication apparatus
3-2. Processing of communication apparatus
4. Hardware configuration of communication apparatus according to embodiment of present disclosure
5. Conclusion <1. Overview of Communication Apparatus According to Embodiment of Present Disclosure>

An overview of a communication apparatus according to an embodiment of the present disclosure will be described with reference to FIG. 1. FIG. 1 is a diagram for describing the overview of the communication apparatus according to the embodiment of the present disclosure.

The communication apparatus according to the embodiment of the present disclosure includes a communication module having a wireless communication function and an application processor module (hereinafter, also referred to as "AP module") having an operation control function of the communication apparatus. The communication module receives data transmitted from another communication apparatus via a radio wave. The AP module has a power supply control function and transitions a state of the AP module to a sleep state, an active state, or the like. The communication module is connected to the AP module and can transmit an instruction about power supply control to the AP module. Therefore, the communication module can indirectly control the state of the AP module on the basis of reception from the another communication apparatus.

For example, a communication apparatus 100 according to an embodiment of the present disclosure can receive data transmitted from another communication apparatus 200 shown in a left drawing of FIG. 1 via a communication module. The communication module can transition a state of an AP module of the communication apparatus 100 from a sleep state to an active state on the basis of reception from the another communication apparatus 200. The AP module in the active state can cause the communication apparatus 100 to perform sound output as shown in, for example, a light drawing of FIG. 1.

Herein, assuming that the communication module of the communication apparatus 100 transitions the state of the AP module to the active state at each time of reception from the another communication apparatus 200, it is difficult to reduce power consumption. Meanwhile, it is considered that the communication module transitions the state of the AP module to the active state at the time of reception from another specified communication apparatus 200. In this case, however, the state of the AP module cannot be transitioned to the active state even in the case where reception from another unspecified communication apparatus 200 is performed. Therefore, it is difficult to cause the AP module to perform processing in accordance with a change in communication environment including another unspecified communication apparatus 200. In view of this, the communication module of the communication apparatus 100 according to the embodiment of the present disclosure transitions the state of the AP module in the case where information obtained by reception from another arbitrary communication apparatus 100 is changed.

For example, as shown in the left drawing of FIG. 1, a user can hold the communication apparatus 100, and the another communication apparatus 200 can be attached to an umbrella possessed by the user. The another communication apparatus 200 transmits, for example, data of information on the own apparatus. The user stands at a position at which the communication apparatus 100 can receive data transmitted from the another communication apparatus 200. Thus, the communication module of the communication apparatus 100 can receive data transmitted from the another communication apparatus 200. Note that the AP module of the communication apparatus 100 can be in the sleep state.

Then, in the case where the user holding the communication apparatus 100 leaves from the umbrella to which the another communication apparatus 200 is attached and moves out of a transmission range R1 of the another communication apparatus 200, the communication module detects interruption of reception from the another communication apparatus 200 and determines that a communication environment has been changed. In the case where it is determined that the communication environment has been changed, the communication module transitions the state of the AP module from the sleep state to the active state. Then, the AP module controls operation of the communication apparatus 100, such as sound output, so that the AP module can notify the user that the user forgot to bring the umbrella.

As described above, the communication apparatus 100 according to the embodiment of the present disclosure includes the communication module and the AP module for controlling operation of the communication apparatus 100, and the communication module transitions the state of the AP module in the case where it is determined that information obtained by reception from another communication apparatus 100 has been changed. Because the state of the AP module is transitioned only in the case where the communication environment is changed, it is possible to control operation of the communication apparatus 100 in accordance with a change in communication environment while reducing power consumption. Note that, although FIG. 1 shows a smartphone as an example of the communication apparatus 100, the communication apparatus 100 may be a tablet terminal, a wristwatch having a communication function, a portable game console, or a portable communication terminal such as a personal digital assistant (PDA). Further, for the convenience of description, communication apparatuses 100 and the like according to tint and second embodiments are distinguished by adding numbers corresponding to the embodiments to the end, such as a communication apparatus 100-1 and a communication apparatus 100-2.

<2. First Embodiment of Present Disclosure (Example of Processing Based on Existence Information)>

Hereinabove, the overview of the communication apparatus 100 according to the embodiment of the present disclosure has been described. Next, a communication apparatus 100-1 according to a first embodiment of the present disclosure will be described. In the communication apparatus 100-1 according to the present embodiment, a communication module controls state transition of an AP module on the basis of existence information

[2-1. Configuration of Communication Apparatus]

A configuration of the communication apparatus 100-1 according to the first embodiment of the present disclosure will be described with reference to FIG. 2. FIG. 2 is a block diagram showing a schematic functional configuration of the communication apparatus 100-1 according to the first embodiment of the present disclosure.

As shown in FIG. 2, the communication apparatus 100-1 according to the present embodiment includes a communication module 110-1 and an application processor module 120 (hereinafter, also referred to as "AP module 120").

The communication module 110-1 includes a communication unit 112, a determination unit 114, a storage unit 116, and a control unit 118.

The communication unit 112 receives data transmitted from another communication apparatus 200. Specifically, the communication unit 112 scans a radio wave transmitted from the another communication apparatus 200 and only receives data transmitted from the another communication apparatus 200 without performing communication/connection with the another communication apparatus 200. For example, the communication unit 112 can perform passive scanning in an advertising channel in accordance with specification of Bluetooth Low Energy (hereinafter, also referred to as "BLE") and receive an advertising packet transmitted from the another communication apparatus 200.

In the case where the communication unit 112 receives data transmitted from the another communication apparatus 200, the communication unit 112 may acquire additional information from the another communication apparatus 200. For example, the communication unit 112 can perform active scanning in accordance with the specification of the BLE and, in the case where the communication unit 112 receives an advertising packet from the another communication apparatus 200, the communication unit 112 can transmit a SCAN_REQ packet to the another communication apparatus 200 that has transmitted the advertising packet. Then, a SCAN_RES packet, in which additional information of the another communication apparatus 200 is stored, is transmitted to the communication apparatus 100-1 from the another communication apparatus 200 that has received the SCAN_REQ packet, and the communication unit 112 can receive the SCAN_RES packet. Note that, in the case where an advertising packet from a transmission source of the SCAN_RES packet is received after reception of the SCAN_RES packet, the communication unit 112 may be set so as not to transmit a SCAN_REQ packet to the another communication apparatus 200 in accordance with the specification of the BLE.

Note that, although the communication unit 112 is desired to constantly perform scanning, the communication unit 112 may intermittently perform scanning. In this case, power consumption can be further reduced.

The determination unit 114 determines whether or not existence information containing identification information of another communication apparatus 200 that communicably exists in the vicinity of the communication apparatus 100-1 has been changed. Specifically, in the case where reception from another communication apparatus 200 having identification information that is not contained in the existence information is performed, the determination unit 114 determines that the existence information has been changed. Further, in the case where, after the previous reception from another communication apparatus 200 having identification information contained in the existence information, further reception from the another communication apparatus 200 has not been performed and a time period determined in advance has elapsed, it is determined that the existence information has been changed. Details of determination processing of the determination unit 114 will be described with reference to FIG. 3A and FIG. 3B. FIG. 3A shows an example of operation performed on the basis of the existence information by the communication apparatus 100-1 according to the present embodiment, and FIG. 3B shows another example of the operation performed on the basis of the existence information by the communication apparatus 100-1 according to the present embodiment.

(Finding Another Communication Apparatus 200)

The determination unit 114 waits until the communication unit 112 performs reception from another communication apparatus 200. For example, as shown in a left drawing of FIG. 3A, in the case where another communicable communication apparatus 200 does not exist in the vicinity of the communication apparatus 100-1 and an advertising packet from another communication apparatus 200 is not received, the determination unit 114 does not perform the determination processing. Note that the AP module 120 can be in a sleep state.

In the case where the communication unit 112 performs reception from another communication apparatus 200, the determination unit 114 determines whether or not identification information of the another communication apparatus 200 is contained in existence information stored in the storage unit 116. For example, as shown in a right drawing of FIG. 3A, in the case where the communication apparatus 100-1 is moved into the transmission range R1 of the another communication apparatus 200 and an advertising packet is transmitted from the another communication apparatus 200, the advertising packet is received by the communication unit 112. Then, the determination unit 114 determines whether or not the identification information of the another communication apparatus 200, for example, identification information unique to the communication apparatus, such as a public device address contained in the advertising packet, is contained in the existence information. Note that the identification information may be generated by the communication unit 112.

In the case where it is determined that the identification information of the another communication apparatus 200 that has performed reception is not contained in the existence information stored in the storage unit 116, the determination unit 114 notifies the control unit 118 of information indicating that the existence information has been changed. For example, in the case where it is determined that the identification information of the another communication apparatus 200 shown in the right drawing of FIG. 3A is not contained in the existence information, the determination unit 114 notifies the control unit 118 of information indicating that the existence information has been changed. Then, the control unit 118 that has received the notification transitions a state of the AP module 120 to an active state, and the AP module 120 controls the communication apparatus 100-1, so that, for example, sound output shown in the right drawing of FIG. 3A is performed.

The determination unit 114 adds, to the existence information, the identification information of the another communication apparatus 200 in which it is determined that the identification information is not contained in the existence information. Note that information such as a reception time is associated with the identification information, and the determination unit 114 updates the information of the identification information such as a reception time.

(Losing Another Communication Apparatus 200)

In the case where it is determined that the identification information of the another communication apparatus 200 that has performed reception is contained in the existence information stored in the storage unit 116, the determination unit 114 does not perform information notification with respect to the control unit 118. For example, as shown in a left drawing of FIG. 3B, in the case where an advertising packet from the another communication apparatus 200 having the identification information contained in the existence information is received, the determination unit 114 determines that the identification information of the another communication apparatus 200 is contained in the existence information and does not provide information to the control unit 118. Note that the determination unit 114 updates the information of the identification information such as a reception time. Because information notification is not performed with respect to the control unit 118, the AP module 120 can be in the sleep state.

For each piece of the identification information contained in the existence information, the determination unit 114 regularly determines whether or not the time period determined in advance has elapsed from a reception time associated with the identification information. For example, the determination unit 114 can regularly determine whether or not the time period determined in advance has elapsed from a reception time of ail advertising packet associated with the is information contained in the existence information. Note that the time period determined in advance can be set in accordance with a transmission interval of an advertising packet. The transmission interval of an advertising packet is, for example, 20 msec to 1 sec, and therefore the time period determined in advance can be set to be longer than 1 sec.

In the case where it is determined that the time period determined in advance has elapsed from the reception time associated with the identification information, the determination unit 114 notifies the control unit 118 of information indicating that the existence information has been changed. For example, as shown in a right drawing of FIG. 3B, in the case where the communication apparatus 100-1 has been moved out of the transmission range R1 of the another communication apparatus 200 and it is determined that the time period determined in advance has elapsed from the reception time associated with the identification information of the another communication apparatus 200, the determination unit 114 notifies the control unit 118 of information indicating that the existence information has been changed. Then, the control unit 118 that has received the notification transitions the state of the AP module 120 to the active state, and the AP module 120 controls the communication apparatus 100-1, so that, for example, sound output shown in the right drawing of FIG. 3B is performed.

Further, the determination unit 114 deletes, from the existence information, the identification information in which it is determined that the time period determined in advance has elapsed from the reception time. Note that the information such as the reception time associated with the identification information can also be deleted.

Herein, the description returns to the configuration of the communication apparatus 100-1 with reference to FIG. 2. The storage unit 116 stores information obtained by reception from another communication apparatus 200. Specifically, the storage unit 116 stores the existence information containing identification information of another communication apparatus 200, a reception time associated with the identification information, and other information obtained by reception. For example, the storage unit 116 can store a public device address included in an advertising packet as the identification information of the another communication apparatus 200 and store a time at which the advertising packet has been received as the reception time. Note that the identification information may be a combination of a random device address with a decryption key.

The control unit 118 controls state transition of the AP module 120. Specifically, the control unit 118 transitions the state of the AP module 120 to the active state on the basis of a result of determination in the determination unit 114 regarding whether or not the existence information has been changed. For example, in the case where the control unit 118 is notified by the determination unit 114 of information indicating that the existence information has been changed, the control unit 118 instructs the AP module 120 to transition the state to the active state. In the case where the control unit 118 is not notified by the determination unit 114 of information indicating that the existence information has been changed, the control unit 118 does not instruct the AP module 120 to transition the state.

As described above, in the case where it is determined that the existence information has been changed, the control unit 118 transitions the state of the AP module 120 to the active state. Therefore, it is possible to cause the AP module 120 to perform processing in accordance with a change in communication environment.

The AP module 120 controls operation of the communication apparatus 100-1 as a control module. Specifically, the AP module 120 controls software, such as application software and system software of the communication apparatus 100-1, and hardware, such as a display unit, a sound output unit, and a vibration output unit. Further, the AP module 120 preforms power supply control of the own module. Specifically, the AP module 120 transitions the own state to the sleep state that is a processing stop state or the active state that is a processable state.

[2-2. Processing of Communication Apparatus]

Processing of the communication apparatus 100-1 in the present embodiment will be described with reference to FIG. 4 and FIG. 5. FIG. 4 is a flowchart conceptually showing processing of the communication apparatus 100-1 in the present embodiment regarding finding another communication apparatus 200, and FIG. 5 is a flowchart conceptually showing processing of the communication apparatus 100-1 in the present embodiment regarding losing another communication apparatus 200. Processing performed when the communication apparatus 100-1 finds the another communication apparatus 200 will be described with reference to FIG. 4.

The communication apparatus 100-1 waits until reception from another communication apparatus 200 is performed (Step S302). Specifically, the communication unit 112 performs scanning for reception from another communication apparatus 200, and the determination unit 114 waits until the communication unit 112 performs reception from another communication apparatus 200.

In the case where reception from another communication apparatus 200 is performed, the communication apparatus 100-1 determines whether or not identification information of the another communication apparatus 200 that has performed reception is contained in the existence information (Step S304). Specifically, in the case where the communication unit 112 performs reception from another communication apparatus 200, the determination unit 114 determines whether or not identification information of the another communication apparatus 200 is contained in the existence information.

In the case where it is determined that the identification information of the another communication apparatus 200 that has performed reception is not contained in the existence information, the communication apparatus 100-1 adds the identification information of the another communication apparatus 200 that has performed reception to the existence information (Step S306). Specifically, in the case where it is determined that the identification information of the another communication apparatus 200 related to the reception is not contained in the existence information, the determination unit 114 adds the identification information of the another communication apparatus to the existence information, associates information such as a reception time with the identifier, and stores the information such as the reception tune in the storage unit 116.

Note that, in the case where it is determined that the identification information of the another communication apparatus 200 that has performed reception is contained in the existence information, information such as a reception time associated with the identification information is updated, and then the processing is terminated.

The communication apparatus 100-1 transitions the state of the AP module 120 to the active state (Step S308). Specifically, in the case where the control unit 118 is notified by the determination unit 114 of information indicating that the existence information has been changed, the control unit 118 instructs the AP module 120 to transition the state from the sleep state to the active state. Then, the AP module 120 that has received the instruction transitions the own state from the sleep state to the active state.

Hereinabove, the processing performed when the communication apparatus 100-1 finds the another communication apparatus 200 has been described. Next, processing performed when the communication apparatus 100-1 loses the another communication apparatus 200 will be described with reference to FIG. 5. Note that the processing shown in FIG. 5 is regularly performed.

The communication apparatus 100-1 determines whether or not identification information of another communication apparatus 200 in which the time period determined in advance has elapsed from the previous reception is contained in the existence information (Step S402). Specifically, for each piece of the identification information contained in the existence information, the determination unit 114 determines whether or not the time period determined in advance has elapsed from a reception time associated with the each piece of the identification information.

In the case where it is determined that the identification information of the another communication apparatus 200 in which the time period determined in advance has elapsed from the previous reception is contained in the existence information, the communication apparatus 100-1 deletes, from the existence information, the identification information in which the predetermined time period has elapsed from the previous reception (Step S404). Specifically, the determination unit 114 deletes, from the existence information, the identification information in which the time period determined in advance has elapsed from the reception time. Note that information such as the reception time associated with the identification information can also be deleted.

Note that, in the case where it is determined that the identification information of the another communication apparatus 200 in which the predetermined time period has elapsed from the previous reception is not contained in the existence information, the processing is terminated.

The communication apparatus 100-1 transitions the state of the AP module 120 to the active state (Step S406). Specifically, this processing is substantially the same as the processing in Step S308 of FIG. 4, and therefore description thereof is omitted.

As described above, according to the first embodiment of the present disclosure, the communication apparatus 100-1 includes the AP module 120 for controlling operation of the communication apparatus 100-1. The communication apparatus also includes the communication module 110-1 for controlling state transition of the AP module 120 in the case where whether or not information obtained by reception from the another communication apparatus 200 has been changed is determined and it is determined that the information obtained by the reception has been changed. Because the state of the AP module is transitioned in the case where a communication environment is changed, it is possible to control operation of the communication apparatus 100 in accordance with a change in communication environment while reducing power consumption.

In the case where there is reception from another communication apparatus 200 having identification information that is not contained in the existence information containing identification information of another communication apparatus 200 that communicably exists in the vicinity of the communication apparatus 100-1, the communication apparatus 100-1 determines that the existence information has been changed and transitions the state of the AP module 120 to the active state. Thus, the state of the AP module 120 is transitioned to the active state in a situation in which the AP module 120 may be required to perform processing, and therefore it is possible to increase an operation opportunity of the AP module while reducing power consumption.

In the case where, after the previous reception from another communication apparatus 200 having identification information contained in the existence information, further reception from the another communication apparatus 200 has not been performed and the time period determined in advance has elapsed, the communication apparatus 100-1 determines that the existence information has been changed and transitions the state of the AP module 120 to the active state. Thus, the state of the AP module 120 is transitioned to the active state also in the case where another communicable communication apparatus 200 is lost, and therefore it is possible to further increase an operation opportunity of the AP module 120 while reducing power consumption.

[2-3. Modification Examples]

Hereinabove, the first embodiment of the present disclosure has been described. Note that the present embodiment is not limited to the above-mentioned example. Hereinafter, first to fourth modification examples of the present embodiment will be described.

(First Modification Example)

As a first modification example of the present embodiment, the communication module 1104 has reception strength information of the another communication apparatus 200, and, in the case where the reception strength is changed, the communication module 110-1 may determine that the reception strength information of the another communication apparatus 200 has been changed and transition the state of the AP module 120 to the active state. Specifically, the communication unit 112 detects the reception strength of a radio wave related to reception from the another communication apparatus 200, and the determination unit 114 determines whether or not the reception strength related to the another communication apparatus 200 has been changed over a threshold with reference to the reception strength information. In the case where it is determined that the reception strength has been changed over the threshold, the determination unit 114 notifies the control unit 118 of information indicating that the reception strength information has been changed, and the control unit 118 that has received the notification instructs the AP module 120 to transition the state to the active state. After the determination processing, the determination unit 114 updates the reception strength of the reception strength information to the detected reception strength. Details of the processing in this modification example will be described with reference to FIG. 6A and FIG. 6B. FIG. 6A shows an example of operation performed on the basis of the reception strength information by the communication apparatus 100-1 according to the first modification example of the present embodiment, and FIG. 6B shows another example of the operation performed on the basis of the reception strength information by the communication apparatus 100-1 according to the first modification example of the present embodiment. Note that, regarding processing substantially the same as the processing in the first embodiment, description thereof is omitted.

Reception Strength is Changed to Value Equal to or Larger Than Threshold

The determination unit 114 waits until the communication unit 112 performs reception from another communication apparatus 200, and, in the case where the communication unit 112 performs reception from another communication apparatus 200, the determination unit 114 determines whether or not identification information of the another communication apparatus 200 is contained in the existence information. For example, in the case where the communication apparatus 100-1 is moved into the transmission range R1 of the another communication apparatus 200 and an advertising packet is transmitted from the another communication apparatus 200 as shown in a left drawing of FIG. 6A, the advertising packet is received by the communication unit 112. Then, the determination unit 114 determines whether or not the identification information of the another communication apparatus 200 is contained in the existence information. Note that the state of the AP module can be the sleep state.

In the case where it is determined that the identification information of the another communication apparatus 200 is not contained in the existence information, the determination unit 114 adds the identification information to the existence information and stores the detected reception strength in the reception strength information associated with the identification information. Further, the determination unit 114 determines whether or not the detected reception strength is equal to or larger than the threshold. Note that the threshold of the reception strength may be a value determined in advance or may be a value changed by setting.

In the case where it is determined that the detected reception strength is not equal to or larger than the threshold the determination unit 114 does not perform information notification with respect to the control unit 118. For example, in the case where a radio wave having the reception strength equal to or larger than the threshold is received within a transmission range R2 of the another communication apparatus 200 shown in the left drawing of FIG. 6A, the communication apparatus 100-1 positions out of the communication range R2, and therefore the determination unit 114 determines that the detected reception strength is less than the threshold and does not perform information notification with respect to the control unit 118. Thus, the AP module can be maintained in the sleep state.

Reception Strength is Changed from Value Less than Threshold to Value Equal to or Larger than Threshold In the case where it is determined that the identification information is contained in the existence information, the determination unit 114 further compares the detected reception strength, the reception strength in the reception strength information associated with the identification information, and the threshold with one another and determines whether or not the reception strength has been changed over the threshold. For example, after the communication unit 112 receives an advertising packet from the another communication apparatus 200 within the transmission range R1 and out of the transmission range R2 shown in the left drawing of FIG. 6A, the communication apparatus 100-1 may be moved and the communication unit 112 may receive an advertising packet from the another communication apparatus 200 within the transmission range R2 shown in a right drawing of FIG. 6A. In this case, in the previous reception, the reception strength related to reception from the another communication apparatus 200 has been stored in the reception strength information, and therefore the determination unit 114 compares the detected reception strength, the reception strength in the reception strength information, and the threshold with one another and determines whether or not the reception strength has been changed over the threshold.

In the case where it is determined that the reception strength has been changed from a value less than the threshold to a value equal to or larger than the threshold, the determination unit 114 notifies the control unit 118 of information indicating that the reception strength information has been changed. Further, the determination unit 114 updates the reception strength in the reception strength information to the detected reception strength. For example, the reception strength in the reception strength information may be the reception strength less than the threshold regarding reception out of the transmission range R2 shown in the right drawing of FIG. 6A, and the communication apparatus 100-1 may position within the transmission range R2. In this case, the reception strength of a radio wave to be received is equal to or larger than the threshold because the communication apparatus 100-1 positions within the transmission range R2. Thus, the determination unit 114 determines that the reception strength has been changed from a value less than the threshold to a value equal to or larger than the threshold, notifies the control unit 118 of information indicating that the reception strength information has been changed, and updates the reception strength in the reception strength information to the detected reception strength.

Then, the control unit 118 that has received the notification instructs the AP module 120 to transition the state to the active state. For example, the control unit 118 can instruct the AP module 120 to transition the state from the sleep state to the active state, and the AP module 120 that has received the instruction can transition the own state to the active state to cause the communication apparatus 100-1 to perform sound output for a user as shown in, for example, the right drawing of FIG. 6A.

Reception Strength is Changed from Value Equal to or Larger than Threshold to Value Less than Threshold In the case where it is determined that the reception strength has not been changed over the threshold, the determination unit 114 does not perform information notification with respect to the control unit 118 and updates the reception strength in the reception strength information to the detected reception strength. For example, in the case where the communication unit 112 receives an advertising packet a plurality of times within the transmission range R2 of the another communication apparatus 200 shown in a left drawing of FIG. 6B, the determination unit 114 determines that the reception strength has not been changed over the threshold, and therefore the determination unit 114 updates the reception strength in the reception strength information to the detected reception strength but does not perform information notification with respect to the control unit 118. Thus, the AP module 120 can be maintained in the sleep state.

In the case where it is determined that the reception strength has been changed from a value equal to or larger than the threshold to a value less than the threshold, the determination unit 114 notifies the control unit 118 of information indicating that the reception strength information has been changed. Further, the determination unit 114 updates the reception strength in the reception strength information to the detected reception strength. For example, as shown in a right drawing of FIG. 6B, after the communication unit 112 receives an advertising packet within the transmission range R2 of the another communication apparatus 200, the communication apparatus 100-1 may be moved and the communication unit 112 may receive an advertising packet within the transmission range R1 and out of the transmission range R2. In this case, the determination unit 114 determines that the reception strength has been changed from a value equal to or larger than the threshold to a value less than the threshold, notifies the control unit 118 of information indicating that the reception strength information has been changed, and updates the reception strength in the reception strength information to the detected reception strength.

The control unit 118 that has received the notification instructs the AP module 120 to transition the state to the active state.

Processing of the communication apparatus 100-1 in the first modification example of the present embodiment will be described with reference to FIG. 7. FIG. 7 is a flowchart conceptually showing processing performed by the communication apparatus 100-1 in the first modification example of the present embodiment when the reception strength information is changed.

The communication apparatus 100-1 waits until reception from another communication apparatus 200 is performed (Step S502), and, in the case where reception from another communication apparatus 200 is performed, the communication apparatus 100-1 determines whether or not identification information of the another communication apparatus 200 that has performed reception is contained in the existence information (Step S504). Specifically, this step is substantially the same as Step S302 in the first embodiment, and therefore description thereof is omitted.

In the case where it is determined that the identification information of the another communication apparatus 200 that has performed reception is not contained in the existence information, the communication apparatus 100-1 adds the identification information of the another communication apparatus 200 that has performed reception to the existence information and stores the reception strength (Step S506). Specifically, in the case where it is determined that the identification information of the another communication apparatus 200 that has performed reception is not contained in the existence information, the determination unit 114 adds the identification information to the existence information and stores the reception strength detected by the communication unit 112 in the reception strength information associated with the identification information.

The communication apparatus 100-1 determines whether or not the reception strength is equal to or larger than the threshold (Step S508). Specifically, the determination unit 114 determines whether or not the reception strength detected by the communication unit 112 is equal to or larger than the threshold.

In the case where it is determined that the reception strength is equal to or larger than the threshold, the communication apparatus 100-1 transitions the state of the AP module 120 to the active state (Step S510). Specifically, in the case where it is determined that the reception strength is equal to or larger than the threshold, the determination unit 114 notifies the control unit 118 of information indicating that the reception strength information has been changed, and the control unit 118 instincts the AP module 120 to transition the state to the active state. The AP module 120 that has received the instruction transitions the own state from the sleep state to the active state.

In the case where it is determined that the identification information is contained in the existence information, the communication apparatus 100-1 determines whether or not the reception strength has been changed from a value less than the threshold to a value equal to or larger than the threshold (Step S512). Specifically, the determination unit 114 compares the reception strength detected by the communication unit 112, the reception strength in the reception strength information associated with the identification information, and the threshold with one another and determines whether or not the reception strength has been changed from a value less than the threshold to a value equal to or larger than the threshold.

In the case where it is determined that the reception strength has been changed from a valueless than the threshold to a value equal to or larger than the threshold, the communication apparatus 100-1 updates the reception strength information of the another communication apparatus 200 that has performed reception (Step S514) and performs the processing in Step S510. Specifically, in the case where it is determined that the reception strength has been changed from a value less than the threshold to a value equal to or larger than the threshold, the determination unit 114 updates the reception strength in the reception strength information to the detected reception strength.

In the case where it is determined that the reception strength has not been changed from a value less than the threshold to a value equal to or larger than the threshold, the communication apparatus 100-1 determines whether or not the reception strength has been changed from a value equal to or larger than the threshold to a value less than the threshold (Step S516). Specifically, the determination unit 114 compares the reception strength detected by the communication unit 112, the reception strength in the reception strength information associated with the identification information, and the threshold with one another and determines whether or not the reception strength has been changed from a value equal to or larger than the threshold to a value less than the threshold.

In the case where it is determined that the reception strength has been changed from a value equal to or larger than the threshold to a value less than the threshold, the communication apparatus 100-1 performs the processing in Step S514 and then performs the processing in Step S510.

In the case where it is determined that the reception strength has not been changed from a value equal to or larger than the threshold to a value less than the threshold, the communication apparatus 100-1 updates the reception strength information of the another communication apparatus 200 that has performed reception (Step S518). Specifically, this processing is substantially the same as the processing in Step S514, and therefore description thereof is omitted.

As described above, according to the first modification example of the present embodiment, the communication module 110-1 has the reception strength information of the another communication apparatus 200, and, in the case where the reception strength is changed, the communication module 110-1 determines that the reception strength information of the another communication apparatus 200 has been changed and transitions the state of the AP module 120 to the active state. Therefore, as compared with the case where the processing is performed on the basis of existence information, it is possible to control state transition of the AP module 120 on the basis of a more detailed positional relationship between the communication apparatus 100-1 and the another communication apparatus 200. Further, as compared with the case where the processing is performed on the basis of existence information, it is possible to reduce power consumption because the number of times of transition of the state of the AP module 120 to the active state is reduced.

Note that, although, in the above example, there has been described an example where the determination unit 114 determines whether or not a communication environment has been changed on the basis of reception strength information, the determination unit 114 may determine whether or not the communication environment has been changed on the basis of combination of existence information and reception strength information. Specifically, in the case where at least one of the existence information and the reception strength information is changed, the control unit 118 is notified of information indicating that the communication environment has been changed, and the control unit 118 instructs the AP module 120 to transition the state to the active state. In this case, it is possible to further increase an operation opportunity of the AP module 120 caused by a change in communication environment while reducing power consumption.

Although, in the above example, there has been described an example where the determination unit 114 determines whether or not the reception strength has been changed over the threshold, the determination unit 114 may determine whether or not a change amount of the reception strength exceeds a threshold of the change amount. For example, in the case where the determination unit 114 calculates a change amount of the reception strength on the basis of the detected reception strength and the reception strength in the reception strength information and the calculated change amount is equal to or larger than the threshold of the change amount, the determination unit 114 determines that the reception strength has been changed. Further, in the case where the calculated change amount is less than the threshold of the change amount, the determination unit 114 determines that the reception strength has not been changed. In this case, when the communication apparatus 100-1 is not moved so much, the state of the AP module 120 is not transitioned to the active state, and therefore it is possible to reduce power consumption.

(Second Modification Example)

Figure 8:
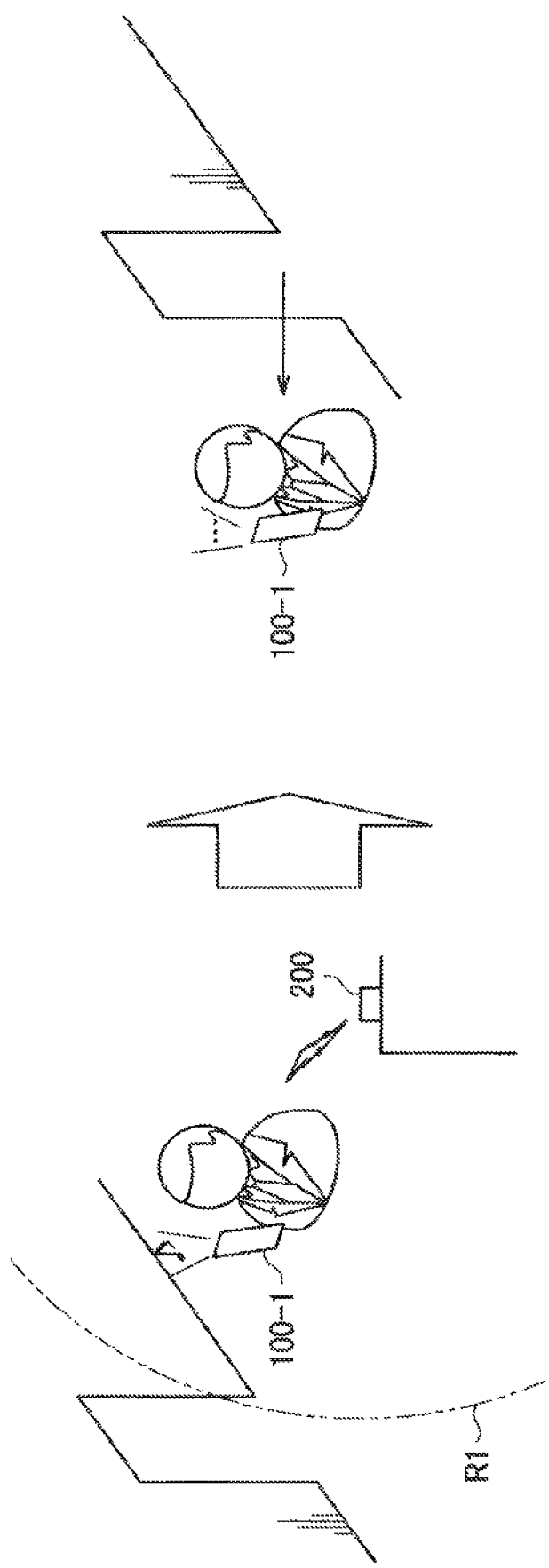
FIG. 8 shows an example of operation of a communication apparatus according to a second modification example of the present embodiment.

As a second modification example of the present embodiment, the communication module 110-1 may transition the state of the AP module 120 to an inactive state in the case where it is determined that the existence information has been changed. For example, in the case where, when identification information of another communication apparatus 200 is deleted from the existence information, no identification information of another communication apparatus 200 is contained in the existence information, the communication module 110-1 transitions the state of the AP module 120 to the inactive state. Specifically, first, the determination unit 114 deletes, from the existence information, identification information in which it is determined that the time period determined in advance has been elapsed from the previous reception time. After the identification information is deleted, the determination unit 114 determines whether or not any identification information is contained in the existence information. In the case where it is determined that no identification information is contained in the existence information, the determination unit 114 notifies the control unit 118 of information indicating that the existence information is empty. The control unit 118 that has received the notification instructs the AP module 120 to transition the state to the inactive state. Details of processing in this modification example will be described with reference to FIG. 8. FIG. 8 shows an example of operation of the communication apparatus 100-1 according to the second modification example of the present embodiment.

As described above, in the case where the communication unit 112 performs reception from another communication apparatus 200, the determination unit 114 determines whether or not identification information of the another communication apparatus 200 is contained in the existence information. In the case where it is determined that the identification information of the another communication apparatus 200 is not contained in the existence information, the determination unit 114 notifies the control unit 118 of information indicating that the existence information has been changed. The control unit 118 that has received the notification instructs the AP module 120 to transition the state to the active state. For example, as shown in a left drawing of FIG. 8, the communication apparatus 100-1 positions within the transmission range R1 of the another communication apparatus 200, and therefore an advertising packet from the another communication apparatus 200 is received by the communication unit 112. In the case where it is determined that the identification information of the another communication apparatus 200 is not contained in the existence information, the determination unit 114 notifies the control unit 118 of information indicating that the existence information has been changed. Further, the determination unit 114 adds the identification information of the another communication apparatus 200 to the existence information. Then, the control unit 118 instructs the AP module 120 to transition the state to the active state, and the AP module 120 transitions the own state to the active state. For example, as shown in the left drawing of FIG. 8, the AP module 120 in the active state can cause the communication apparatus 100-1 to perform sound output.

For each piece of the identification information contained in the existence information, the determination unit 114 regularly determines whether or not the time period determined in advance has elapsed from a reception time associated with the identification information and deletes, from the existence information, the identification information in which it is determined that the time period determined in advance has elapsed from the reception time. For example, as shown in aright drawing of FIG. 8, in the case where the communication apparatus 100-1 has been moved out of the transmission range R1 of the another communication apparatus 200, reception from the another communication apparatus 200 has not been performed, and the time period determined in advance has elapsed, the determination unit 114 determines that the time period determined in advance has elapsed from the reception time associated with the identification information of the another communication apparatus 200. Then, the determination unit 114 deletes the identification information of the another communication apparatus 200 from the existence information.

Then, the determination unit 114 determines whether or not any identification information is contained in the existence information. For example, as shown in the right drawing of FIG. 8, in the case where another communicable communication apparatus 200 does not exist in the vicinity of the communication apparatus 100-1, no identification information is contained in the existence information because the identification information has been deleted as described above. Therefore, the determination unit 114 determines that no identification information is contained in the existence information.

Then the determination unit 114 notifies the control unit 118 of information indicating that the existence information is empty, and the control unit 118 instructs the AP module 120 to transition the state to the inactive state. For example, the control unit 118, which has been notified by the determination unit 114 of information indicating that the existence information is empty, can instruct the AP module 120 to transition the state to the sleep state. Then, the AP module 120 that has received the instruction can transition the own state to the sleep state. Note that the inactive state may be a deep sleep state or a not-started state in which power consumption is lower than the power consumption in the sleep state.

Figure 9:
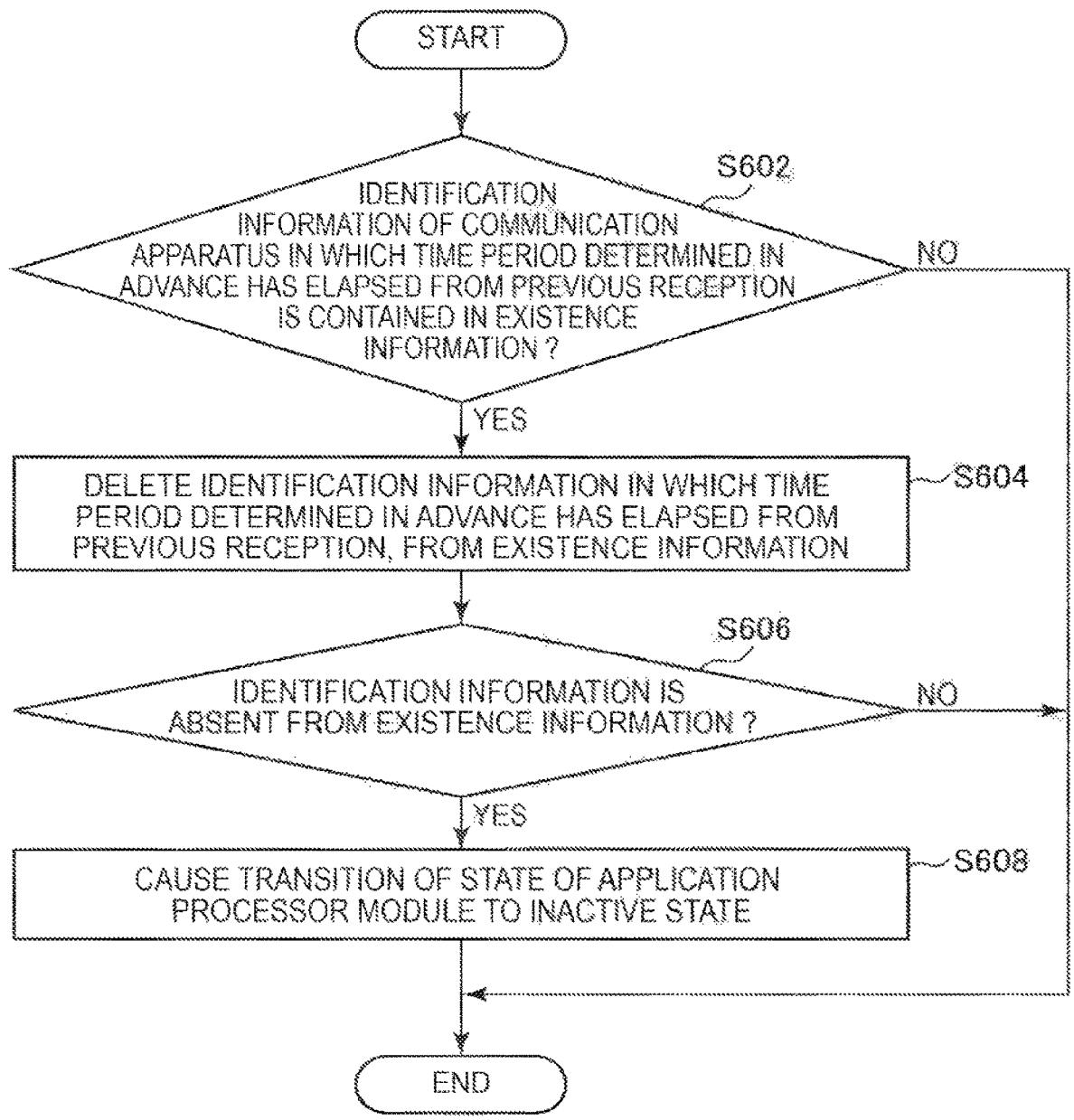
FIG. 9 is a flowchart conceptually showing transition processing of the communication apparatus in the second modification example of the present embodiment to an inactive state.

Processing of the communication apparatus 100-1 in the second modification example of the present embodiment will be described with reference to FIG. 9. FIG. 9 is a flowchart conceptually showing transition processing of the communication apparatus 100-1 in the second modification example of the present embodiment to the inactive state.

The communication apparatus 100-1 determines whether or not identification information of another communication apparatus 200 in which the time period determined in advance has elapsed from the previous reception is contained in the existence information (Step S602), and, in the case where it is determined that the identification information of the another communication apparatus 200 in which the time period determined in advance has elapsed from the previous reception is contained in the existence information, the communication apparatus 100-1 deletes, from the existence information, the identification information in which the predetermined time period has elapsed from the previous reception (Step S604). Specifically, this processing is substantially the same as the processing in Step S402 and Step S404 in FIG. 5 according to the first embodiment, and therefore description thereof is omitted.

Then, the communication apparatus 100-1 determines whether or not any identification information is contained in the existence information (Step S606). Specifically, the determination unit 114 determines whether or not any identification information is contained in the existence information, i.e., the existence information is empty.

In the case where it is determined that no identification information is contained in the existence information, the communication apparatus 100-1 transitions the state of the AP module 120 to the inactive state (Step S608). Specifically, the determination unit 114 notifies the control unit 118 of information indicating that the existence information is empty, and the control unit 118 instructs the AP module 120 to transition the state to the inactive state.

As described above, according to the second modification example of the present embodiment, in the case where, when the identification information of the another communication apparatus 200 is deleted from the existence information, no identification information of another communication apparatus 200 is contained in the existence information, the communication module 110-1 transitions the state of the AP module 120 to the inactive state. Therefore, the state of the AP module 120 is transitioned to the inactive state in the case where there is a low possibility that the AP module 120 is required to perform processing, and thus it is possible to optimize an operation timing of the AP module 120 and further reduce power consumption.

(Third Modification Example)

As a third modification example of the present embodiment, after the state of the AP module 120 is transitioned to the active state, the AP module 120 may show, to a user, information on a change in information obtained by reception from another communication apparatus 200. Specifically, based on information specifying another communication apparatus 200, the information being received from the another communication apparatus 200, the AP module 120 shows, to a user, information of the another communication apparatus 200 regarding a change in existence information or the like. For example, in the case where the determination unit 114 determines that the existence information has been changed, the control unit 118 instructs the AP module 120 to transition the state to the active state, and the AP module 120 transitions the own state to the active state. Then, the AP module 120 in the active state acquires identification information of the another communication apparatus 200 from the communication module 110-1. Further, the AP module 120 acquires information related to the acquired identification information from a storage unit or the like inside the own module and displays the identification information and the information related to the identification information on, for example, a display unit separately provided to the communication apparatus 100-1. For example, the identification information can be a public device address or the like containable in an advertising packet received by the communication unit 112, and the information related to the identification information can be information on a user of the another communication apparatus 200 having the identification information.

In the case where the AP module 120 is instructed by the control unit 118 to transition the state to the active state, the AP module 120 controls a sound output unit, a vibration output unit, a lighting unit, or the like separately provided to the communication apparatus 100-1 and shows, to the user, that the state of the AP module 120 has been transitioned to the active state, i.e., the existence information or the like has been changed. For example, the AP module 120 can cause the communication apparatus 100-1 to output a warning sound, vibrate the communication apparatus 100-1, or turn on a light emitting diode (LED) included in the communication apparatus 100-1.

As described above, according to the third modification example of the present embodiment, after the AP module 120 transitions to the active state, the AP module 120 shows information on a change in existence information or the like to a user. Therefore, it is possible to make the user aware of a change in communication environment to encourage the user to perform a behavior such as operation of the communication apparatus 100-1.

Further, based on information specifying another communication apparatus 200, the information being received from the another communication apparatus 200, the AP module 120 shows, to the user, information of the another communication apparatus 200 regarding a change in existence information or the like. Thus, the another communication apparatus 200 related to a change in communication environment is shown to the user, and therefore the user can determine necessity of operation of the communication apparatus 100-1. This makes it possible to improve usability for the user.

(Fourth Modification Example)

As a fourth modification example of the present embodiment, the AP module 120 may provide information received from another communication apparatus 200 to an external device outside the communication apparatus 100-1. Specifically, in the case where the state of the AP module 120 is transitioned to the active state, the AP module 120 acquires information on another communication apparatus 200 from the communication module 110-1 and stores the acquired information on the another communication apparatus 200 in the storage unit inside the AP module 120. Further, in the case where, when the state of the AP module 120 is transitioned to the active state, the number of times of transition to the active state is a predetermined number of times, the AP module 120 transmits the information on the another communication apparatus 200 stored in the storage unit inside the AP module 120 to the external device via a communication control unit separately provided to the communication apparatus 100-1. For example, communication of the communication control unit can be mobile phone communication such as wired communication, third-generation communication, or long term evolution (LTE), and the external device can be, for example, a server that performs a cloud service. Note that the AP module 120 in the active state may cause the communication module 110-1 to perform communication/connection with the another communication apparatus 200 and transmit information acquired via the communication/connection to the external device.

As described above, according to the fourth modification example of the present embodiment, the AP module 120 provides information received from the another communication apparatus 200 to the external device outside the communication apparatus 100-1. Thus, information on another arbitrary communication apparatus 200 is provided to the external device while power consumption is being reduced, and therefore it is possible to extend duration of provision of information to the external device.

<3. Second Embodiment of Present Disclosure (Example of Processing Using Camera Module)>

Hereinabove, the communication apparatus 100-1 according to the first embodiment of the present disclosure has been described. Next, a communication apparatus 100-2 according to a second embodiment of the present disclosure will be described. In the communication apparatus 100-2 according to the present embodiment, a communication module controls state transition of a camera module on the basis of existence information, and state transition of an AP module is controlled on the basis of a result of processing of the camera module.

[3-1. Configuration of Communication Apparatus]

Figure 10:
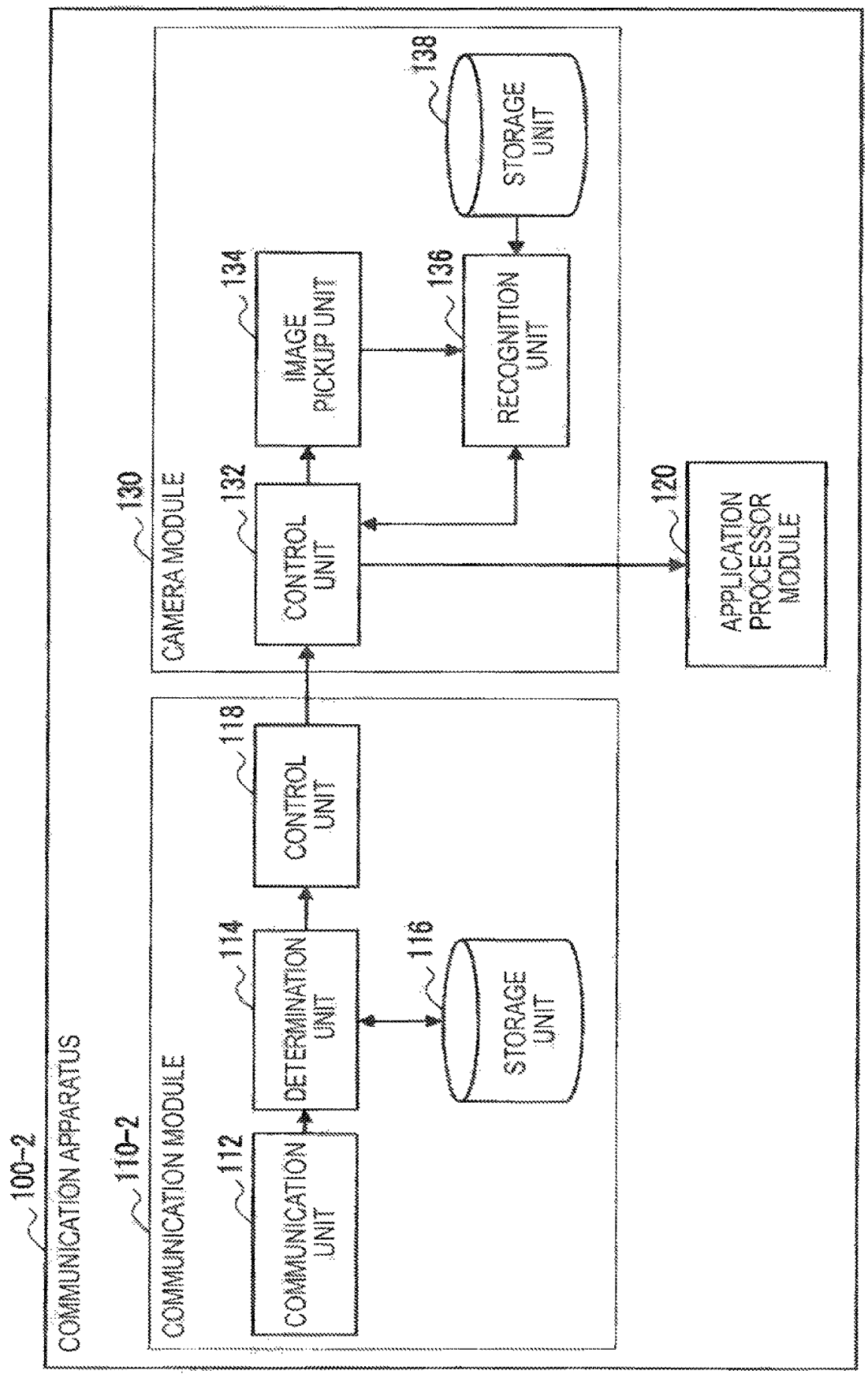
FIG. 10 is a block diagram showing a schematic functional configuration of a communication apparatus according to a second embodiment of the present disclosure.

A configuration of the communication apparatus 100-2 according to the second embodiment of the present disclosure will be described with reference to FIG. 10. FIG. 10 is a block diagram showing a schematic functional configuration of the communication apparatus 100-2 according to the second embodiment of the present disclosure.

As shown in FIG. 10, the communication apparatus 100-2 includes a communication module 110-2, an AP module 120, and a camera module 130.

A control unit 118 of the communication module 110-2 controls state transition of the camera module 130. Specifically, the control unit 118 transitions a state of the camera module 130 to an active state on the basis of a result of determination in the determination unit 114 regarding whether or not existence information has been changed. Note that operation of the control unit 118 is substantially the same as the operation of the control unit 118 in the first embodiment, and therefore detailed description thereof is omitted.

As shown in FIG. 10, the camera module 130 includes a control unit 132, an image pickup unit 134, a recognition unit 136, and a storage unit 138.

Figure 11:
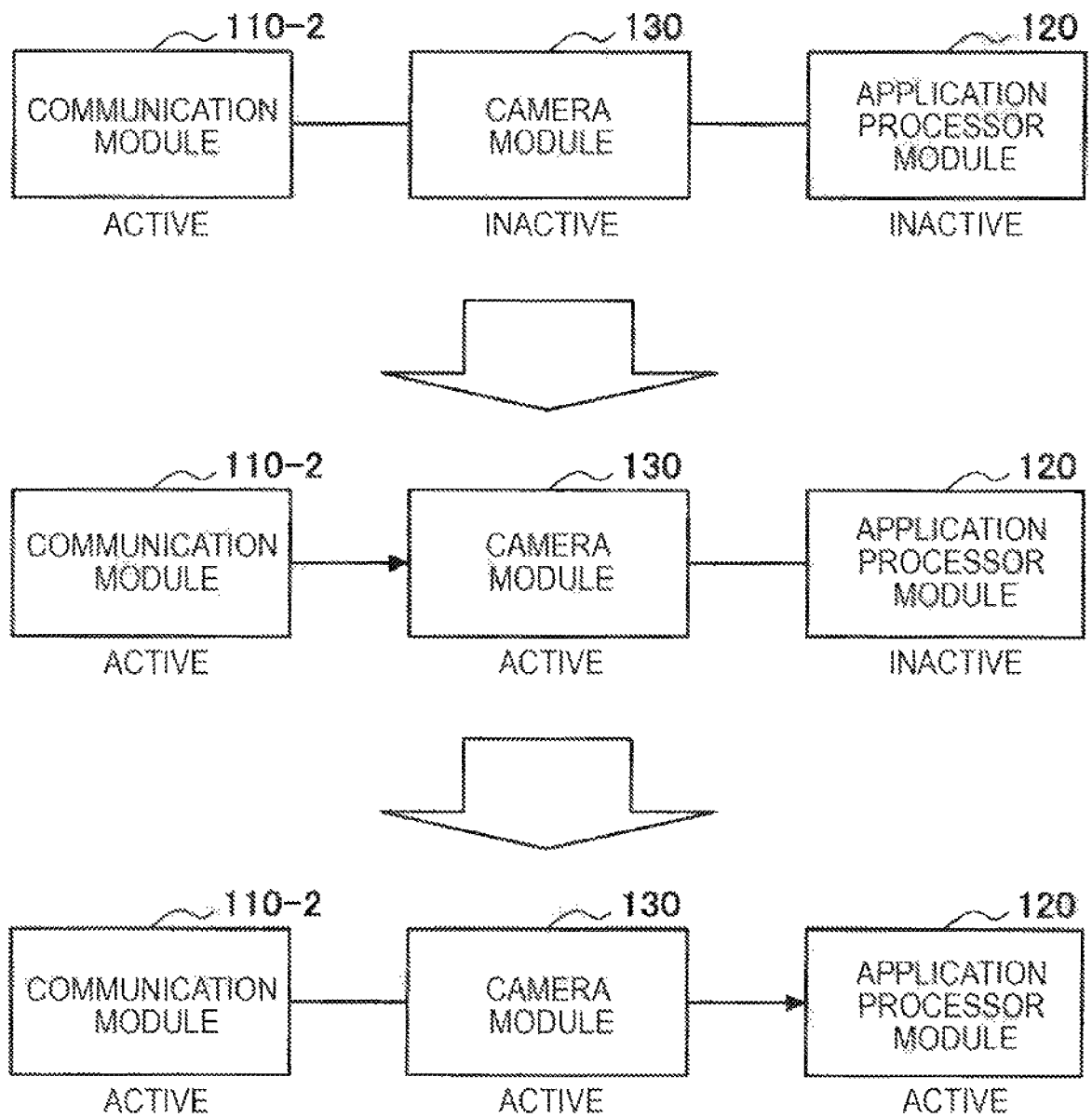
FIG. 11 shows an example of state transition of each module in a communication apparatus 100-2 in the present embodiment.

The control unit 132 has a power supply control function of the camera module 130 and controls state transition of the camera module 130. Specifically, in the case where the control unit 118 of the communication module 110-2 instructs the control unit 132 to perform state transition, the control unit 132 transitions the state of the camera module 130 to the instructed state. The state transition of the camera module 130 will be described with reference to FIG. 11. FIG. 11 shows an example of state transition of each module in the communication apparatus 100-2 in the present embodiment.

In the case where the communication apparatus 100-2 is started, a state of the communication module 110-2 is transitioned to an active state, but states of the camera module 130 and the AP module 120 are transitioned to an inactive state. For example, as shown in a top drawing of FIG. 11, immediately after the communication apparatus 100-2 is started, the communication module 110-2 can be in the active state, and the camera module 130 and the AP module 120 can be in the inactive state such as a sleep state.

In the case where, in the communication module 110-2, it is determined that a communication environment has been changed, the communication module 110-2 transitions the state of the camera module 130 to the active state. For example, in the case where it is determined that existence information of another communication apparatus 200 has been changed, as shown in a middle drawing of FIG. 11, the communication module 110-2 instructs the camera module 130 to transition the state to the active state. Then, the camera module 130 transitions the own state to the active state. Note that the AP module 120 is not instructed to transition the state, and therefore the AP module 120 is maintained in the inactive state.

In the case where human recognition processing succeeds in the camera module 130, the camera module 130 transitions the state of the AP module 120 to the active state. For example, in the case where human recognition regarding a captured image succeeds, as shown in a bottom drawing of FIG. 11, the camera module 130 instructs the AP module 120 to transition the state to the active state. Then, the AP module 120 transitions the own state to the active state.

Herein, the description returns to the configuration of the communication apparatus 100-1 with reference to FIG. 10. The control unit 132 controls operation of the image pickup unit 134 and the recognition unit 136. Specifically, in the case where the state of the camera module 130 is transitioned to the active state in response to an instruction from the control unit 118, the control unit 132 transmits operation instructions to the image pickup unit 134 and the recognition unit 136.

The control unit 132 instructs the AP module 120 to transition the state on the basis of a result of processing of the recognition unit 136. Specifically, in the case where the recognition unit 136 succeeds in human recognition regarding an image captured by the image pickup unit 134, the control unit 132 instructs the AP module 120 to transition the state to the active state.

The image pickup unit 134 captures an image to generate an image of the vicinity of the communication apparatus 100-2. Specifically, in the case where an operation instruction is transmitted from the control unit 132, the image pickup unit 134 captures an image of the vicinity of the communication apparatus 100-2. For example, the image pickup unit 134 can include an image pickup optical system such as a taking lens for concentrating light and a zoom lens and a signal conversion element such as a charge coupled device (CCD) or a complementary metal oxide semiconductor (CMOS).

The recognition unit 136 performs human recognition in an image. Specifically, the recognition unit 136 acquires an image captured by the image pickup unit 134 and determines whether or not a person stored in the storage unit 138 is included in the acquired image. In the case where it is determined that a person stored in the storage unit 138 is included in the acquired image, the recognition unit 136 notifies the control unit 132 of information indicating that human recognition has succeeded. For example, the recognition unit 136 can determine a person by using a face recognition technology, a skeleton detection technology, or the like.

The storage unit 138 stores information for use in human recognition. For example, the storage unit 138 can store face information of a specific person or general face information such as sex or age.

[3-2. Processing of Communication Apparatus]

Figure 12:
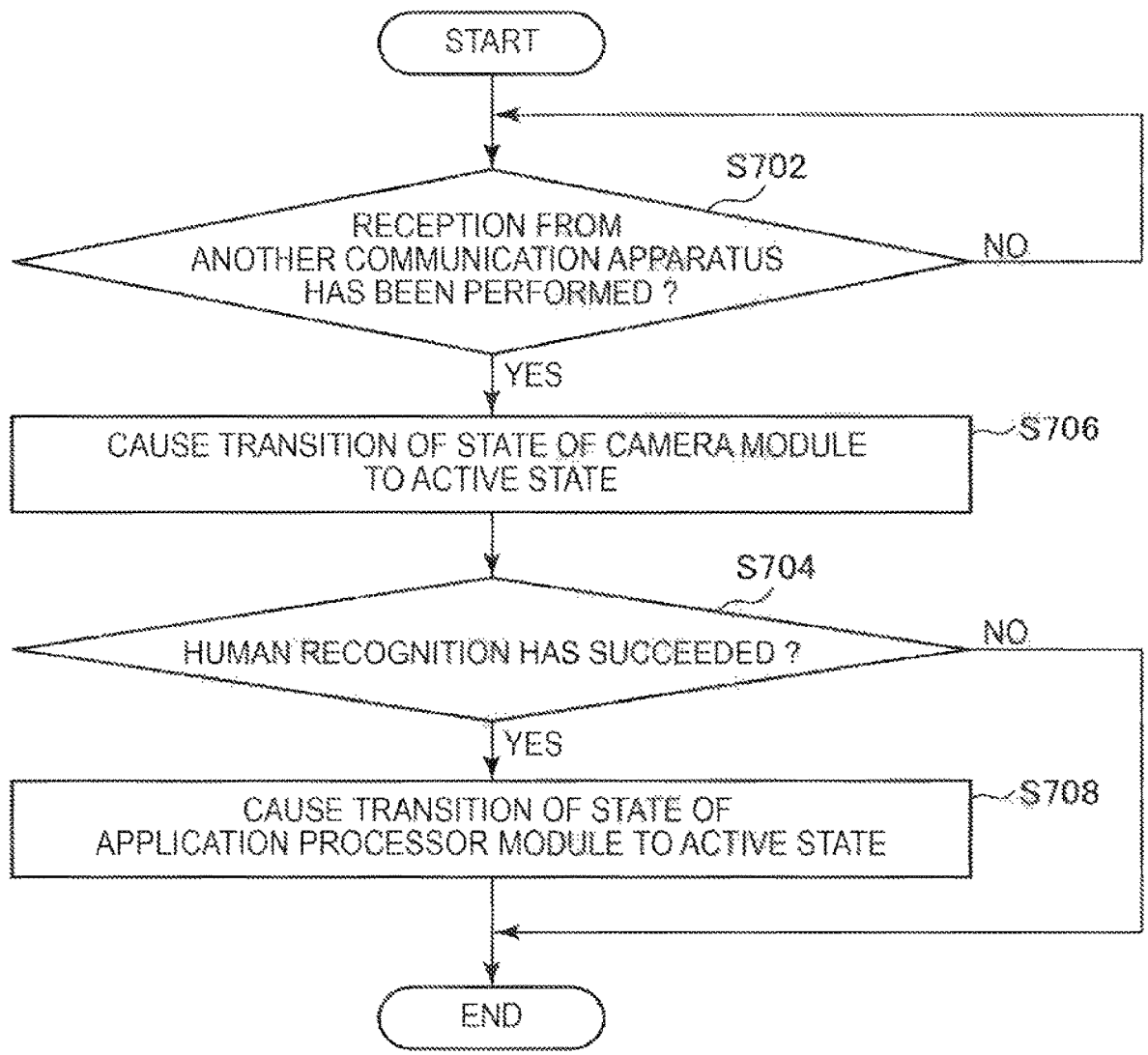
FIG. 12 is a flowchart conceptually showing processing of the communication apparatus in the present embodiment regarding finding another communication apparatus.

Processing of the communication apparatus 100-2 in the present embodiment will be described with reference to FIG. 12. FIG. 12 is a flowchart conceptually showing processing of the communication apparatus 100-2 in the present embodiment regarding finding another communication apparatus 200.

The communication apparatus 100-2 waits until reception from another communication apparatus 200 is performed (Step S702). Specifically, this step is substantially the same as Step S302 in the first embodiment, and therefore description thereof is omitted.

In the case where reception from another communication apparatus 200 is performed, the communication apparatus 100-2 transitions the state of the camera module 130 to the active state (Step S706). Specifically, in the case where the determination unit 114 notifies the control unit 118 of information indicating that the existence information has been changed, the control unit 118 instructs the control unit 132 of the camera module 130 to transition the state from the sleep state to the active state. Then, the control unit 132 transitions the state of the camera module 130 to the active state.

Then, the communication apparatus 100-2 performs human recognition (Step S704). Specifically, the control unit 132 transmits operation instructions to the image pickup unit 134 and the recognition unit 136, and the image pickup unit 134 captures an image of the vicinity of the communication apparatus 100-2, and then the recognition unit 136 performs human recognition on the basis of the image captured by the image pickup unit 134.

In the case where human recognition succeeds, the communication apparatus 100-2 transitions the state of the AP module 120 to the active state (Step S708). Specifically, in the case where the control unit 132 is notified by the recognition unit 136 of information indicating that human recognition has succeeded, the control unit 132 instructs the P module 120 to transition the state from the sleep state to the active state. Then, the AP module 120 that has received the instruction transitions the own state from the sleep state to the active state.

As described above, according to the second embodiment of the present disclosure, in the case where the communication module 110-2 determines that the existence information has been changed, the communication apparatus 100-2 transitions the state of the camera module 130 to the active state. Further, the state of the AP module 120 is transitioned to the active state on the basis of a result of processing of the camera module 130. Thus, a condition for transitioning the state of the AP module 120 to the active state is added and therefore it is possible to improve accuracy of an operation timing of the AP module 120 and further reduce power consumption.

Note that, although, in the above example, there has been described an example where the state of the AP module 120 is transitioned to the active state on the basis of a result of processing of the camera module 130, the state of the AP module may be transitioned on the basis of a result of processing of another sensor module for detecting an external environment of the communication apparatus 100-2. For example, the sensor module may be a sound collection module, and the communication module 110-2 transitions a state of the sound collection module to an active state in the case where it is determined that the existence information has been changed. The sound collection module can acquire voice in the vicinity of the communication apparatus 100-2 in the case where the own state is transitioned to the active state. In the case where characteristics of a specific voice stored in a storage unit inside the sound collection module and an acquired voice, such as frequencies, are matched, the sound collection module transitions the state of the AP module 120 to the active state. In this case, information of the vicinity of the communication apparatus 100-2 can be acquired even in an environment in which acquisition of visual information is difficult, such as a dark place.

<4. Hardware Configuration of Communication Apparatus According to Embodiment of Present Disclosure>

Embodiments of the present disclosure are described above. The processing of the communication apparatus 100 described above is implemented by cooperation between software and hardware of the communication apparatus 100 described below.

Figure 13:
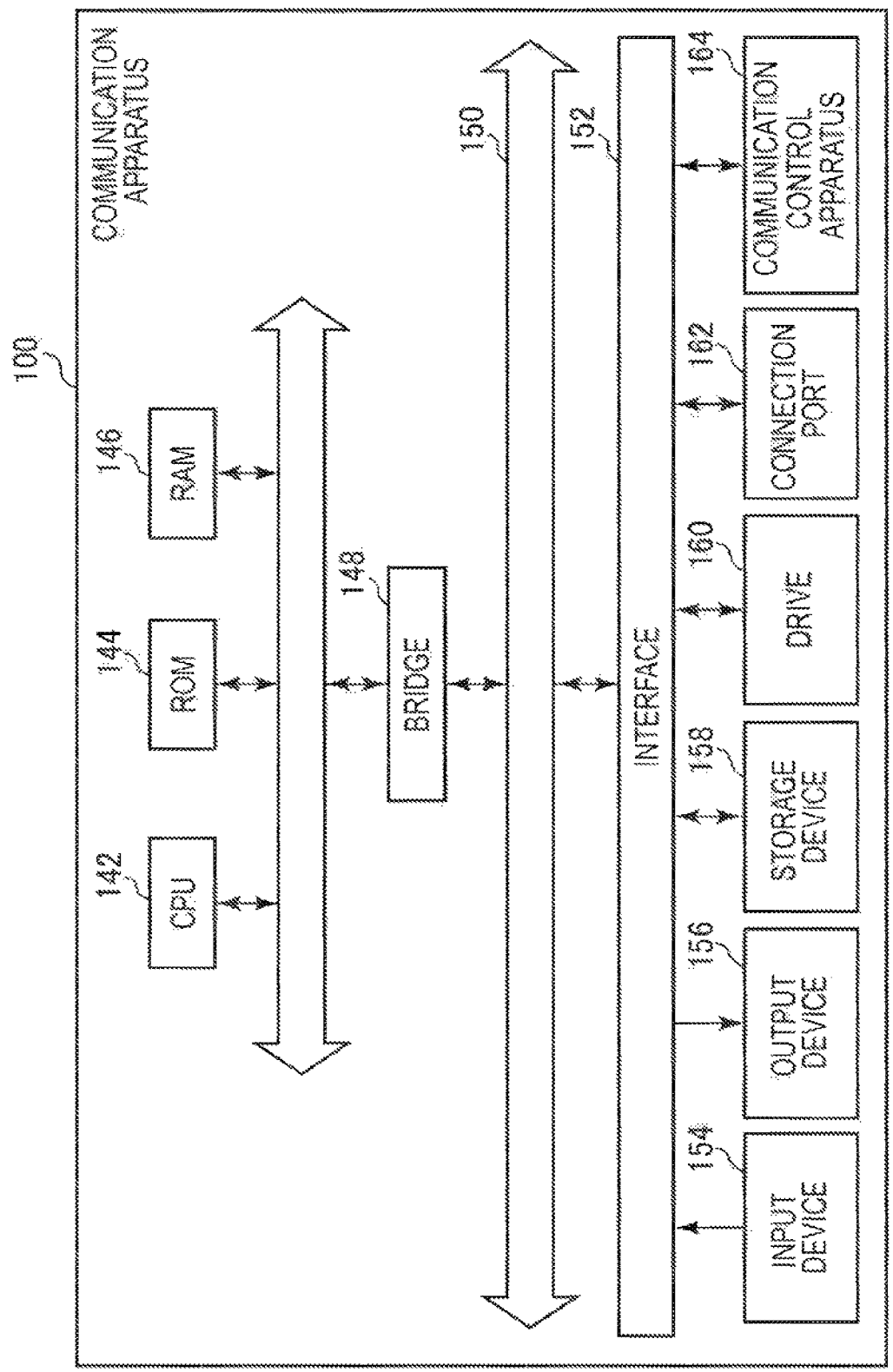
FIG. 13 is a diagram for describing a hardware configuration of a communication apparatus according to the present disclosure.

FIG. 13 is a diagram for describing the hardware configuration of the communication apparatus 100 according to an embodiment of the present disclosure. As illustrated in FIG. 13, the communication apparatus 100 contains a central processing unit (CPU) 142, a read only memory (ROM) 144, a random access memory (RAM) 146, a bridge 148, a bus 150, an interface 152, an input device 154, an output device 156, a storage device 158, a drive 160, a connection port 162, and a communication control apparatus 164.

The CPU 142 functions as an arithmetic processing unit and a control device and cooperates with various programs to realize operation of the determination unit 114, the control unit 118, the AP module 120, the control unit 132, and the recognition unit 136 in the communication apparatus 100. The CPU 142 may be a microprocessor. The ROM 144 stores programs, operation parameters, or the like to be used by the CPU 142. The RAM 146 temporarily stores programs for use in the execution of the CPU 142, parameters which change as appropriate in the execution, and the like. By the ROM 144 and the RAM 146, a part of the storage unit 116 and the storage unit 138 in the communication apparatus 100 is realized. The CPU 142, the ROM 144, and the RAM 146 are connected to each other through an internal bus constituted by a CPU bus and the like.

The input device 154 is an example of the imaging unit 134 of the communication apparatus 100, and is constituted by an input unit which allows the user to input information, such as a mouse, a keyboard, a touch panel, a button, a microphone, a switch, and a lever, an input control circuit which generates an input signal based on a captured image and an input by the user, and then outputs the signal to the CPU 142, and the like. The user of the communication apparatus 100 can operate the input device 154 to input various data to the communication apparatus 100 or instruct the communication apparatus 100 to perform a processing operation.

The output device 156 performs an output operation to a device, such as a liquid crystal display (LCD), an organic light emitting diode (OLED), and a lamp. Furthermore, the output device 156 may include a loudspeaker and a headphone for outputting sound.

The storage device 158 is a device for data storage. The storage device 158 may include a storage medium, a recording device for recording data in the storage medium, a reading device for reading the data from the storage medium, and a deleting device for deleting data recorded in the storage medium. The storage device 158 stores a program executed by the CPU 142 and various types of data.

The drive 160 is a reader-writer for a storage medium and is built in or externally attached to the communication apparatus 100. The drive 160 reads out information recorded on a removable storage medium that is attached thereto, such as magnetic disk, an optical disk, a magneto-optical disk, or a semiconductor memory, and then outputs the information to the RAM 146. The drive 160 is also able to write information to a removable storage medium.

The connection port 162 is a bus for connection with the information processing device or peripheral devices provided outside the communication apparatus 100. The connection port 162 may be universal serial bus (USB).

The communication control device 164 is an example of the communication unit 112 of the communication apparatus 100, and is a communication interface constituted by a communication apparatus for connection with a network. The communication control device 164 may be an infrared communication compatible device, a wireless local area network (LAN) compatible communication apparatus, a long-term evolution (LTE) compatible communication apparatus, or a wired communication apparatus that performs communication through wire.

<5. ConclusioN>

Hereinabove, according to the first embodiment of the present disclosure, the state of the AP module is transitioned in the case where a communication environment is changed, and therefore it is possible to control operation of the communication apparatus 100 in accordance with a change in communication environment while reducing power consumption. Further, according to the second embodiment of the present disclosure, a condition for transitioning the state of the AP module 120 to the active state is added, and therefore it is possible to improve accuracy of an operation timing of the AP module 120 and further reduce power consumption.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although, for example, a module subjected to state transition control is a module such as the AP module 120 or the camera module 130 in the above embodiments, this technology is not limited to such examples. For example, the module subjected to state transition control may be an arbitrary processing module having a power supply control function.

Further, in the above examples, there has been described an example where the communication module 110 operates in accordance with the specification of the BLE. However, the communication module 110 may operate in accordance with specification of short-range wireless communication other than BLE or Bluetooth as long as the above-mentioned operation can be performed.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A communication apparatus including:
a control module configured to control operation of the communication apparatus; and
a communication module configured to determine whether or not information obtained by reception from another communication apparatus has been changed and control state transition of the control module in a case where it is determined that the information obtained by the reception has been changed.

(2)

The communication apparatus according to (1), wherein control of the state transition of the control module includes transition of a state of the control module to an active state.

(3)

The communication apparatus according to (2), wherein the information obtained by the reception includes existence information containing identification information of another communication apparatus that communicably exists in the vicinity of the communication apparatus, and in a case where reception from another communication apparatus having identification information that is not contained in the existence information is performed, the communication module determines that the existence information has been changed and causes transition of the state of the control module to the active state.

(4)

The communication apparatus according to (3), wherein, when, after previous reception from another communication apparatus having the identification information contained in the existence information, further reception from the another communication apparatus has not been performed and a time period determined in advance has elapsed, the communication module determines that the existence information has been changed and causes transition of the state of the control module to the active state.

(5)

The communication apparatus according to any one of (2) to (4), wherein the information obtained by the reception includes reception strength information of another communication apparatus, and in a case where a reception strength has been changed, the communication module determines that the reception strength information has been changed and causes transition of the state of the control module to the active state.

(6)

The communication apparatus according to any one of (2) to (5), wherein the control module includes a first control module and a second control module, the communication module causes transition of a state of the first control module to an active state as the control of the state transition of the control module, and the first control module causes transition of a state of the second control module to an active state on the basis of a result of processing of the first control module.

(7)

The communication apparatus according to (6), wherein the first control module is a sensor module configured to detect an external environment of the communication apparatus, and the second control module is an application processor module.

(8)

The communication apparatus according to any one of (2) to (7), wherein the control module includes an application processor module, and the application processor module transitions to an active state and then shows, to a user, information related to a change in the information obtained by the reception.

(9)

The communication apparatus according to (8), wherein, based on information specifying another communication apparatus received from the another communication apparatus, the application processor module shows, to a user, information of the another communication apparatus related to a change in the information obtained by the reception.

(10)

The communication apparatus according to any one of (7) to (9), wherein the application processor module provides information received from another communication apparatus to an external device outside the communication apparatus.

(11)

The communication apparatus according to (4), wherein the control of the state transition of the control module includes transition of the state of the control module to an inactive state, and when the time period determined in advance has elapsed, the communication module deletes the identification information of the another communication apparatus from the existence information, and, in a case where no identification information of another communication apparatus is contained in the existence information, the communication module causes transition of the state of the control module to an inactive state.

(12)

A communication method including:

controlling operation of a communication apparatus by using a control module;

determining whether or not information obtained by reception from another communication apparatus has been changed; and controlling state transition of the control module in a case where it is determined that the information obtained by the reception has been changed.

(13)

A program causing a computer to realize a function of controlling operation of a communication apparatus by using a control module, a function of determining whether or not information obtained by reception from another communication apparatus has been changed, and a function of controlling state transition of the control module in a case where it is determined that the information obtained by the reception has been changed.

REFERENCE SIGNS LIST 100 communication apparatus
110 communication module
112 communication unit
114 determination unit
116 storage unit
118 control unit
120 application processor module
130 camera module
132 control unit
134 image pickup unit
136 recognition unit
138 storage unit

The invention claimed is:

1. A communication method comprising:

controlling operation of a communication apparatus with a computer-implemented controller;

determining whether or not information obtained by reception from another communication apparatus has been changed;

controlling a state transition of the computer-implemented controller to an active state in response to a determination that the information obtained by the reception has been changed;

transitioning an operation state of a controlled device to the active state based on the result of the controlling of the controller state transition, wherein the controlled device is a camera comprising recognition circuitry; and controlling the camera to capture image data and the recognition circuitry to perform recognition on the image data in response to the controlling of the controller state transition.

2. The communication method according to claim 1, wherein the information obtained by the reception includes existence information composed of identification information of another communication apparatus that exists in a vicinity of the communication apparatus and within wireless communications range of the communication apparatus, and causing a transition of the state of the controlled device to the active state based on the change of the existence information.

3. The communication method according to claim 2, wherein the controlling of the state transition of the computer-implemented controller is triggered through a wireless signal transmitted from the another communication apparatus.

4. The communication method according to claim 3, wherein the another communication apparatus is a hand held communication device.

5. The communication method according to claim 4, wherein the handheld communication device is a smartphone.

6. The communication method according to claim 1, wherein the transition includes transitioning from a sleep state to the active state.

7. The communication method according to claim 2, wherein the wireless communications range is a short wireless communication range, and the another communication apparatus being within the short wireless communication range of the communication apparatus.

8. The communication method according to claim 7, wherein the short wireless communications range is a Bluetooth communication range, and the another communication apparatus being within the Bluetooth communication range of the communication apparatus.

9. A non-transitory computer readable medium that stores a computer program when executed by one or more processors performs a method, the method comprising:
controlling operation of a communication apparatus with a computer-implemented controller;
determining whether or not information obtained by reception from another communication apparatus has been changed;
controlling a state transition of the computer-implemented controller to an active state in response to a determination that the information obtained by the reception has been changed;
transitioning an operation state of a controlled device to the active state based on the result of the controlling of the controller state transition, wherein the controlled device is a camera comprising recognition circuitry; and
controlling the camera to capture image data and the recognition circuitry to perform recognition on the image data in response to the controlling of the controller state transition.

10. The non-transitory computer readable medium of claim 9, wherein the information obtained by the reception includes existence information composed of identification information of another communication apparatus that exists in a vicinity of the communication apparatus and within wireless communications range of the communication apparatus, and causing a transition of the state of the controlled device to the active state based on the change of the existence information.

11. The non-transitory computer readable medium of claim 10, wherein the controlling of the state transition of the computer-implemented controller is triggered through a wireless signal transmitted from the another communication apparatus.

12. The non-transitory computer readable medium of claim 11, wherein the another communication apparatus is a hand held communication device.

13. The non-transitory computer readable medium of claim 12, wherein the handheld communication device is a smartphone.

14. The non-transitory computer readable medium of claim 9, wherein the transitioning includes transitioning from a sleep state to the active state.

15. The non-transitory computer readable medium of claim 10, wherein the wireless communications range is a short wireless communication range, and the another communication apparatus being within the short wireless communication range of the communication apparatus.

16. The non-transitory computer readable medium of claim 15, wherein the short wireless communications range is a Bluetooth communication range, and the another communication apparatus being within the Bluetooth communication range of the communication apparatus.

* * * * *